US011613289B2

(12) United States Patent
Kim

(10) Patent No.: US 11,613,289 B2
(45) Date of Patent: Mar. 28, 2023

(54) CART FOLLOWING TRANSMISSION MODULE BASED ON POSITION INFORMATION OF TRANSMISSION MODULE AND METHOD FOR MOVING THEREOF

(71) Applicant: LG ELECTRONICS INC., Seoul (KR)

(72) Inventor: Sunryang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 16/765,693

(22) PCT Filed: Jan. 28, 2019

(86) PCT No.: PCT/KR2019/001184
§ 371 (c)(1),
(2) Date: May 20, 2020

(87) PCT Pub. No.: WO2020/158963
PCT Pub. Date: Aug. 6, 2020

(65) Prior Publication Data
US 2021/0206416 A1 Jul. 8, 2021

(51) Int. Cl.
*B62B 5/00* (2006.01)
*G05D 1/02* (2020.01)
*G05D 1/12* (2006.01)
*B62B 3/00* (2006.01)

(52) U.S. Cl.
CPC ......... *B62B 5/0076* (2013.01); *G05D 1/0274* (2013.01); *G05D 1/12* (2013.01); *B62B 3/001* (2013.01)

(58) Field of Classification Search
CPC ......... B62B 5/0076; B62B 3/001; B62B 5/02; G05D 1/0274; G05D 1/12; G05D 2201/0211; G05D 1/0238; G05D 1/028; G05D 1/0212; G05D 1/0268
See application file for complete search history.

(56) References Cited

U.S. PATENT DOCUMENTS

| | | | | |
|---|---|---|---|---|
| 4,844,493 A | * | 7/1989 | Kramer | B62B 3/12 250/342 |
| 5,167,389 A | * | 12/1992 | Reimers | B60L 50/60 280/DIG. 6 |
| 6,142,251 A | * | 11/2000 | Bail | G05D 1/0255 180/167 |

(Continued)

FOREIGN PATENT DOCUMENTS

JP  2008-145383 A  6/2008
KR  10-2016-0078140 A  7/2016
(Continued)

*Primary Examiner* — Bhavesh V Amin
(74) *Attorney, Agent, or Firm* — Birch, Stewart, Kolasch & Birch, LLP

(57) ABSTRACT

A cart that follows a transmission module based on position information of the transmission module and a method for moving the cart are provided. According to an embodiment of the present disclosure, the cart accumulatively stores the position information of the transmission module and generates a moving path based on the position information of the transmission module and moves.

18 Claims, 15 Drawing Sheets

(56) References Cited

U.S. PATENT DOCUMENTS

| | | | |
|---|---|---|---|
| 7,996,281 B2* | 8/2011 | Alvarez | G06Q 10/08 |
| | | | 705/27.2 |
| 8,365,850 B2* | 2/2013 | Gal | B62K 3/002 |
| | | | 180/209 |
| 10,197,999 B2* | 2/2019 | Doane | G05D 1/0278 |
| 10,331,126 B2* | 6/2019 | Doane | G05D 1/0238 |
| 10,649,451 B2* | 5/2020 | Doane | G05D 1/028 |
| 10,942,510 B2* | 3/2021 | Ko | G05D 1/0011 |
| 10,962,971 B2* | 3/2021 | Doane | G05D 1/0088 |
| 11,256,266 B2* | 2/2022 | Lee | G05D 1/0225 |
| 11,269,335 B2* | 3/2022 | Murai | G05D 1/0234 |
| 2001/0015375 A1* | 8/2001 | Swartz | G06Q 30/06 |
| | | | 235/383 |
| 2006/0059049 A1* | 3/2006 | Morris | G06Q 30/02 |
| | | | 705/26.1 |
| 2006/0136285 A1* | 6/2006 | Alvarez | G06Q 10/08 |
| | | | 705/7.29 |
| 2006/0145838 A1* | 7/2006 | Alvarez | G06Q 30/02 |
| | | | 340/539.13 |
| 2006/0163349 A1* | 7/2006 | Neugebauer | G06Q 20/387 |
| | | | 235/383 |
| 2006/0247847 A1* | 11/2006 | Carter | H02K 7/1846 |
| | | | 701/498 |
| 2007/0018811 A1* | 1/2007 | Gollu | G06Q 10/087 |
| | | | 340/8.1 |
| 2007/0085682 A1* | 4/2007 | Murofushi | G07C 9/28 |
| | | | 340/8.1 |
| 2007/0225879 A1* | 9/2007 | French | G06Q 10/087 |
| | | | 701/519 |
| 2008/0004796 A1* | 1/2008 | Schott | G01C 21/005 |
| | | | 701/434 |
| 2008/0077511 A1* | 3/2008 | Zimmerman | G06Q 10/087 |
| | | | 705/28 |
| 2009/0002163 A1* | 1/2009 | Farrington | G08B 13/2402 |
| | | | 340/572.1 |
| 2009/0030780 A1* | 1/2009 | York | G06Q 30/02 |
| | | | 705/7.29 |
| 2009/0140850 A1* | 6/2009 | Kangas | G07G 1/0081 |
| | | | 345/173 |
| 2009/0179753 A1* | 7/2009 | Bonner | G01S 11/06 |
| | | | 340/539.32 |
| 2010/0241290 A1* | 9/2010 | Doane | G05D 1/028 |
| | | | 701/2 |
| 2011/0140380 A1* | 6/2011 | Ulrich | G06Q 30/0603 |
| | | | 280/33.992 |
| 2013/0339184 A1* | 12/2013 | Shouraboura | G06Q 30/0639 |
| | | | 705/26.8 |
| 2014/0371909 A1* | 12/2014 | Lee | G05D 1/0246 |
| | | | 700/259 |
| 2015/0120421 A1* | 4/2015 | Deshpande | G06Q 30/0269 |
| | | | 705/14.25 |
| 2015/0127496 A1* | 5/2015 | Marathe | G06Q 10/087 |
| | | | 705/28 |
| 2015/0371178 A1* | 12/2015 | Abhyanker | G06Q 10/083 |
| | | | 705/330 |
| 2016/0261698 A1* | 9/2016 | Thompson | G06V 10/242 |
| 2016/0334230 A1* | 11/2016 | Ross | G01C 21/3415 |
| 2016/0364785 A1 | 12/2016 | Wankhede | |
| 2016/0364786 A1 | 12/2016 | Wankhede | |
| 2016/0366818 A1* | 12/2016 | Ouyang | G05D 1/028 |
| 2017/0000307 A1* | 1/2017 | Choi | H04B 17/27 |
| 2017/0050659 A1* | 2/2017 | Cardano | G05D 1/0088 |
| 2017/0108860 A1* | 4/2017 | Doane | G08G 1/16 |
| 2017/0269597 A1* | 9/2017 | Maekawa | G05D 1/0287 |
| 2018/0059682 A1* | 3/2018 | Thode | B60W 40/105 |
| 2018/0099846 A1* | 4/2018 | High | G08G 1/20 |
| 2018/0120835 A1* | 5/2018 | Doane | G08G 1/16 |
| 2018/0173223 A1* | 6/2018 | Doane | G05D 1/0255 |
| 2019/0041848 A1* | 2/2019 | Doane | A63B 55/61 |
| 2019/0151725 A1* | 5/2019 | Bennett | A63B 1/00 |
| 2019/0163174 A1* | 5/2019 | Ko | G05D 1/0219 |
| 2019/0163175 A1* | 5/2019 | Ko | G05D 1/0022 |
| 2019/0235493 A1* | 8/2019 | Doane | G08G 1/16 |
| 2019/0377353 A1* | 12/2019 | Murai | G05D 1/0274 |
| 2019/0377357 A1* | 12/2019 | Lee | G05D 1/0088 |
| 2020/0097002 A1* | 3/2020 | Doane | G05D 1/0016 |
| 2021/0206416 A1* | 7/2021 | Kim | B62B 5/0076 |
| 2021/0311474 A1* | 10/2021 | Zhu | G05D 1/0088 |

FOREIGN PATENT DOCUMENTS

| | | |
|---|---|---|
| KR | 10-2018-0109118 A | 10/2018 |
| KR | 10-2018-0109124 A | 10/2018 |

* cited by examiner

CART FOLLOWING TRANSMISSION MODULE BASED ON POSITION INFORMATION OF TRANSMISSION MODULE AND METHOD FOR MOVING THEREOF

CROSS REFERENCE TO RELATED APPLICATIONS

This application is the National Phase of PCT International Application No. PCT/KR2019/001184, filed on Jan. 28, 2019, the entirety of which is hereby expressly incorporated by reference into the present application.

TECHNICAL FIELD

A method for travelling a cart that follows a user and a cart for implementing such method are disclosed herein.

BACKGROUND ART

In spaces in which human resources and material resources are actively exchanged such as large-scale marts, department stores, airports, and golf courses, various persons may move with various types of objects carried. In this case, devices such as carts may assist users in moving objects, to provide the user with convenience.

In the related art, the user may directly move the cart. The cart may be placed far away from user during checking, by the user, various types of products in the space. In this situation, it may take a long time for the user to control the cart and a lot of effects may be required to control, by the user, the cart.

Therefore, the apparatuses such as the cart may be required to be moved while following the user without additionally controlling, by the user, apparatuses such as the cart, so that the user freely moves and performs various types of activities.

In the present disclosure, provided is a method for moving apparatuses such as carts having mobility while following the user based on movement of the user, without control of the user.

DISCLOSURE

Technical Problem

In the present disclosure, a cart may store position information of a user at short time intervals so that the cart may track the position of the user and may move.

Further, in the present disclosure, the cart may convert a current position of the user and a position of the cart, in a space, into absolute coordinates so that the cart tracks previous positions of the user and may move.

Further, in the present disclosure, the cart may maintain a predetermined distance from the user and may follow the user and the cart may move based on a moving path of the user, as well as avoiding obstacles.

The objects of the present disclosure are not limited to the above-mentioned objects, and other objects and advantages of the present disclosure which are not mentioned above may be understood by the following description, and will be more clearly understood by the embodiments of the present disclosure. It will also be readily apparent that the objects and advantages of the present disclosure may be implemented by features defined in claims and a combination thereof.

Technical Solution

According to an exemplary embodiment of the present disclosure, a cart of following a transmission module based on position information of a transmission module may include a positioning sensor configured to receive a signal from the transmission module and measure a position of the transmission module; an obstacle sensor configured to sense an obstacle disposed around the cart; a controller configured to accumulatively store the position information of the transmission module and generate a moving path corresponding to the stored position information of the transmission module; and a driver configured to move along the moving path.

A method for following, by a cart, a transmission module and moving based on position information of a transmission module may include receiving, by a positioning sensor, a signal from the transmission module and measuring a position of the transmission module; storing, by a controller, the position information of the transmission module accumulatively; generating, by the controller, a moving path corresponding to the stored position information of the transmission module; and moving, by a driver, the cart along the moving path.

Advantageous Effects

When embodiments of the present disclosure are applied, a cart may store position information of a user with short time intervals and may track the position of the user, and may move along a moving trajectory of the user.

When embodiments of the present disclosure are applied, the cart may convert, into absolute coordinates, a current position of the user and a position of the cart in the space and may track previous positions of the user, so that the cart may move.

When embodiments of the present disclosure are applied, the cart may follow the user while maintaining a predetermined distance between the cart and the user and may move along a moving path of the user while avoiding obstacles.

When embodiments of the present disclosure are applied, the cart may reconfigure the current position of the cart as origin point in absolute coordinate under predetermined conditions. As a result, error occurring during accumulation of a moving distance of a wheel and error in direction of the wheel, when the cart moves, may be reset.

When embodiments of the present disclosure are applied, the error occurring during the movement of the cart may be reset and the position of the cart may be reconfigured based on an accurate absolute coordinate, thereby improving accuracy in measurement of the position of the user and the generation of the moving path thereof, by the cart.

When embodiments of the present disclosure are applied, the user is closed to the cart within a predetermined range, as the cart initializes the position of the user and the position of the cart based on the absolute coordinate, the error accumulated based on the position of the cart and the position of the user is repeatedly removed, so that the cart accurately follows the user.

When embodiments of the present disclosure are applied, even if accuracy in signal may be degraded when a lot of users and carts are provided, and error in a moving distance and a direction, of the cart, may occur due to collision between carts, the cart may reconfigure the position of the cart and the position of the user based on the repetitive absolute coordinates, thereby enabling the cart to accurately follow the user.

When embodiments of the present disclosure are applied, initialization of the absolute coordinate based on the distance between the user and the cart may reduce error occurring during measurement of the position thereof, and physical error occurring in the moving distance or the direction of the cart, thereby improving the accuracy in movement of the cart.

The effects of the present disclosure are not limited to the above effects, and those skilled in the art may easily understand various effects of the present disclosure based on configurations of the present disclosure.

DETAILED DESCRIPTIONS

Figure 1:
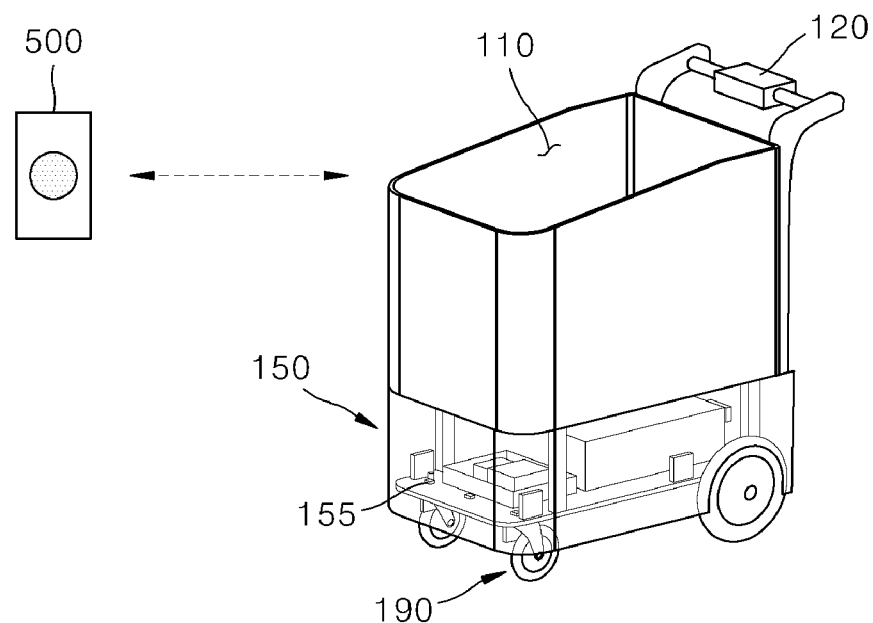
FIG. 1 shows appearance of a cart according to an embodiment of the present disclosure.

Hereinafter, embodiments of the present disclosure will be described in detail with reference to the drawings so that those skilled in the art to which the present disclosure pertains may easily implement the present disclosure. The present disclosure may be implemented in many different manners and is not limited to the embodiments described herein.

In order to clearly illustrate the present disclosure, technical explanation that is not directly related to the present disclosure may be omitted, and same or similar components are denoted by a same reference numeral throughout the present disclosure. Further, some embodiments of the present disclosure will be described in detail with reference to the exemplary drawings. In adding reference numerals to components of each drawing, the same components may have the same reference numeral as possible even when they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to implementation of the present disclosure, the present disclosure may be described by subdividing an individual component, for convenience of explanation, the components of the present disclosure may be implemented within a apparatus or a module, or a component of the present disclosure may be implemented by being divided into a plurality of apparatuses or modules.

Apparatuses that autonomously move while following the user are referred to as "a smart cart" or "a cart" for short. Carts may be used in shops such as large-scale marts or department stores. Alternatively, carts may be used by users in spaces in which many trippers move such as airports or harbors. Further, carts may be used in leisure spaces such as golf courses. In addition, carts include all types of apparatuses that track the position of the user and follow the user and define a predetermined storage space.

Figure 2:
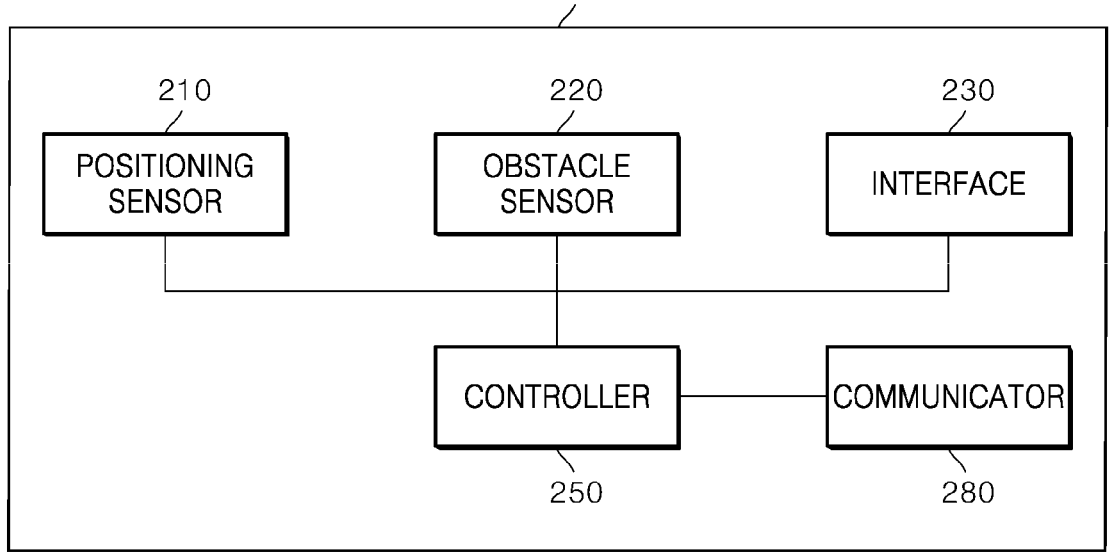
FIG. 2 shows components of a control module of a cart according to an embodiment of the present disclosure.

FIG. 1 shows appearance of a cart according to an embodiment of the invention. FIG. 2 shows components of a control module 150 of a cart according to an embodiment of the present disclosure.

A cart 100 includes a storage portion 110, a handle assembly 120, a control module 150, and a driver 190. The storage portion 110 defines a space in which articles are stored or piled by a user. The handle assembly 120 enables a user to manually control movement of the cart 100 or to semi-automatically control movement of the cart 100.

The user may push the cart 100 forward and rearward using the handle assembly 120. The control module 150 controls the movement of the cart 100. In particular, the control module 150 controls the movement of the cart 100 so that the cart 100 follows the user.

The control module 150 may control the driver 190. Further, positioning sensors that track the position of the user to follow the user may be disposed in various areas of the cart 100. Further, an obstacle sensor that senses an obstacle around the cart 100 may be disposed in various area of the cart 100.

The obstacle sensor may be disposed at a lower end of the cart 100. For example, a plurality of obstacle sensors 220 may be disposed in an area indicated by reference numeral 155 to sense obstacles at a front portion, a left portion, a right portion, and a rear portion of the cart. In one embodiment, the obstacle sensor may be disposed at a position corresponding to a direction in which the cart 100 moves, such as a front surface and both sides of the cart. Alternatively, when the cart 100 moves rearward, the obstacle sensor may be disposed at the front side, the rear side, and both sides of the cart 100.

The positioning sensor 210 may track a position of a user who carries a transmission module 500 and may be disposed at the upper side of the cart 100. However, the positions of these sensors may change according to embodiments and the present disclosure is not limited thereto. Regardless of the positions of the sensors, the controller 150 controls the sensors or uses information sensed by the sensors. That is, the sensors are logical elements of the control module 150 regardless of the physical positions thereof An interface that outputs predetermined information to a user may be disposed in the handle assembly 120, and the interface may also be controlled by the control module 150.

Further, the cart 100 may be remotely located to check the position of the transmission module 500 carried by the user so that the cart 100 moves while following the user.

FIG. 2 shows a positioning sensor 210, an obstacle sensor 220, an interface 230, a controller 250, and a communicator 280, which are logical components included in a control module 150. The positioning sensor 210 receives a signal from the transmission module 500 and measures the position of the transmission module 500.

When the positioning sensor 210 uses ultra-wideband (UWB), the user may carry a transmission module 500 that transmits, to the positioning sensor 210, a predetermined signal. Further, the positioning sensor 210 may identify the position of the user based on the position of the transmission module 500. In one embodiment, the user may carry a band-shaped transmission module attached to a wrist of the user.

The obstacle sensor 220 senses an obstacle disposed around the cart.

The controller 250 accumulatively stores position information of a transmission module and generates a moving path corresponding to the stored position information of the transmission module. The controller 250 may store information on an absolute position (an absolute coordinate) having a predetermined reference point, based on the position information of the transmission module 500 and the cart 100 to accumulatively store the position information of the transmission module.

The driver 190 moves along the moving path. The controller 250 may determine the position of the cart 100 based on a rotation speed, a number of rotations, and a direction of the wheel, through the movement of the driver 190.

The cart 100 following the transmission module based on the position information of the transmission module 500 includes examples in FIGS. 1 and 2.

The communicator 280 remotely upgrades software of the control module 150 or receives, from outside, the position information of the transmission module 500 when the positioning sensor 210 may not measure the position of the transmission module 500.

Alternatively, a predetermined advertisement may be output to the interface 230, and the communicator 280 may receive information to be output to the interface 230 such as an advertisement or a message. Further, the communicator 280 may transmit, to an external server, information on a product stored in the storage portion 110, thereby facilitating payment of the user in unmanned stores.

Figure 3:
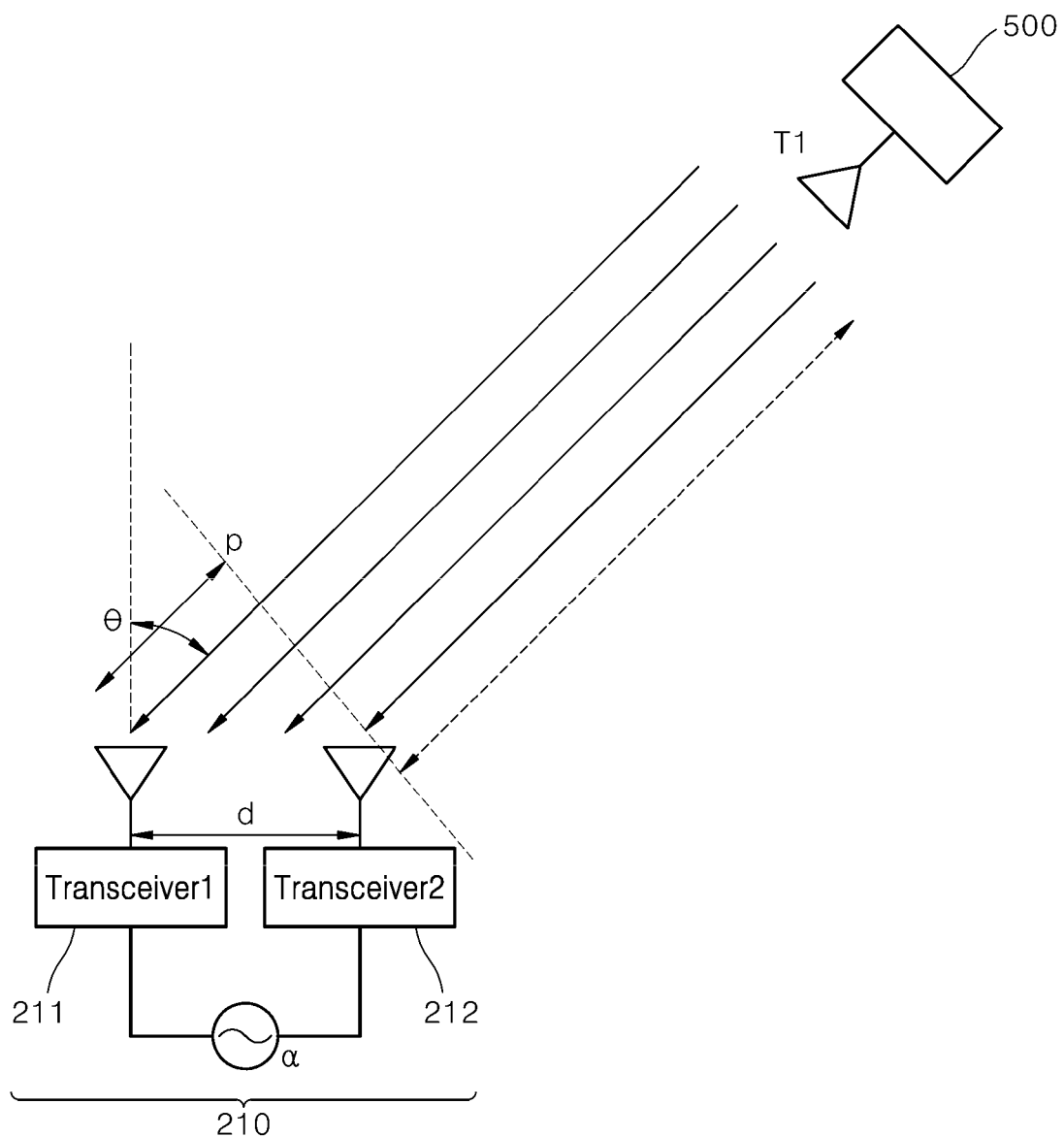
FIG. 3 shows a process of identifying, by a positioning sensor, a position of a user according to an embodiment of the present disclosure.

FIG. 3 shows a process of identifying, by a positioning sensor, a position of a user according to an embodiment of the present disclosure. As shown in FIG. 3, the positioning sensor uses the ultra-wideband (UWB) to identify the position of the user through a method of Angle of Arrival (AOA).

The positioning sensor 210 may include two transceivers 211 and 212. The two transceivers 211 and 212 may be spaced apart from each other by a distance corresponding to a size of d.

The transmission module 500 carried by the user may transmit a signal or may receive the signal from the transceivers 211 and 212 and subsequently may transmit the signal. The transceivers 211 and 212 disposed in the cart 100 receive signals from the transmission module 500. When distance 1 between the transmission module 500 and the positioning sensor 210 is greater than d, the received signal has a form of a plane wave and has an incident form as shown in FIG. 3. The controller 250 may calculate the position of T1 when the controller 250 confirmed distance 1 and angle θ. Distance 1 may be calculated in various manner. In one embodiment of the present disclosure, the controller 250 may calculate distance 1 through two-wary ranging (TWR).

Meanwhile, angle θ may be calculated in Equation 1. In Equation 1, p refers to a difference in distance between signals incident on the transceivers 211 and 212. d is a constant and refers to a distance between two transceivers 211 and 212. α refers a phase difference between signals received by the two transceivers 211 and 212. λ is a constant and refers to a frequency wavelength.

$$\sin\theta = \frac{p}{d}$$
$$\alpha = \frac{2\pi p}{\lambda}$$
$$p = \frac{\alpha\lambda}{2\pi}$$
$$\theta = \sin^{-1}\frac{\alpha\lambda}{2\pi d}$$

[Equation 1]

Figure 4:
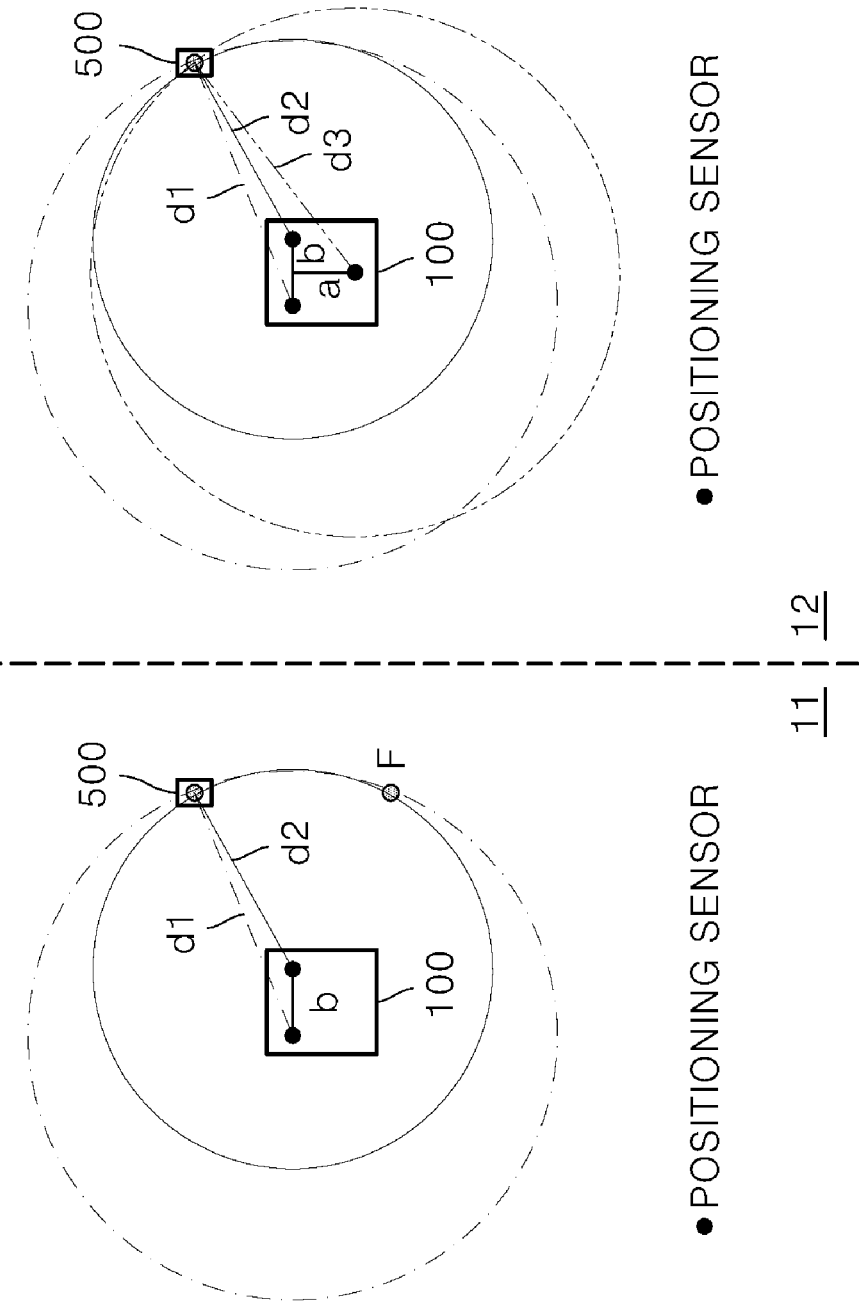
FIG. 4 shows a process of identifying, by a positioning sensor, a position of a user according to another embodiment of the present disclosure.

FIG. 4 shows a process of identifying, by a positioning sensor, a user according to another embodiment of the present disclosure. As shown in FIG. 4, the positioning sensor identifies a position of a user through a method of a time of flight (ToF) using ultra-wideband (UWB).

Trilateration may be used to determine the position (a distance and an angle) of the transmission module 500 carried by the user, for example, a band.

As shown in FIG. 4, at least two of positioning sensors may be disposed in the cart to determine the position of the band and the distance between the band and the cart and at least two of positioning sensors may be spaced apart from each other by a predetermined distance. The distance between the positioning sensors may be greater than a distance of d in FIG. 3.

In reference numeral 11 in FIG. 4, the position of the transmission module may be determined based on distances (d1 and d2) between positioning sensors disposed at two positions of the cart 100, respectively, and the transmission module 500, and a distance b between the positioning sensors. In reference numeral 12 in FIG. 4, the position of the transmission module may be determined based on distances (d1, d2, and d3) among positioning sensors disposed at three positions of the cart 100, respectively, and the transmission module 500, and distances a and b among the positioning sensors.

As two positioning sensors are used in reference numeral 11, it is possible to calculate two positions, for example, an actual position of the transmission module 500 and a virtual position (F) of the transmission module 500. However, as the controller 250 tracks the position of the transmission module 500 sensed by the positioning sensor at short time intervals, the controller 250 may accurately identify the position of the transmission module 500 based on the previous position of the transmission module 500, among two positions (reference numerals 500 and F).

FIGS. 3 and 4 respectively show a process of tracking a position of a user according to an embodiment of the present disclosure. In the configuration as shown in FIG. 3, one positioning sensor may be used. In the configuration as shown in FIG. 4, two or more positioning sensors may be used. In FIG. 4, as a distance between the positioning sensors increases, the position of the transmission module 500 may be accurately identified, so that the positioning sensors may be disposed in the cart 100 so that the positioning sensors are not blocked by the object and easily determine the position of the transmission module 500.

Further, when a technology for positioning based on the UWB is in the embodiment in FIGS. 3 and 4, communication failure occurring due to straightness of electromagnetic wave may be resolved. Further, the positioning sensors may be disposed at particular positions of the cart so that the positioning sensors may not be interfered with various types of obstacles in the store, for example, a stand where products are displayed, a storage, and an aisle.

In one embodiment, two positioning sensors 210 may be disposed on at upper end of the cart 100. Transceivers that perform functions of a transmitter/a receiver based on the UWB may be provided in one sensor 210 and one set may include the transceivers that perform the functions of the transmitter/the receiver based on the UWB. Two transceivers may be disposed in the cart 100.

In the embodiment in FIG. 3, the transceivers including a set of transmitter/receiver are indicated by reference numerals 211 and 212, respectively, and the positioning sensor including these transceivers may be placed at the upper end of the cart 100.

Further, an additional sensor that detects forward and rearward movement of the cart may be disposed in the positioning sensor.

Figure 5:
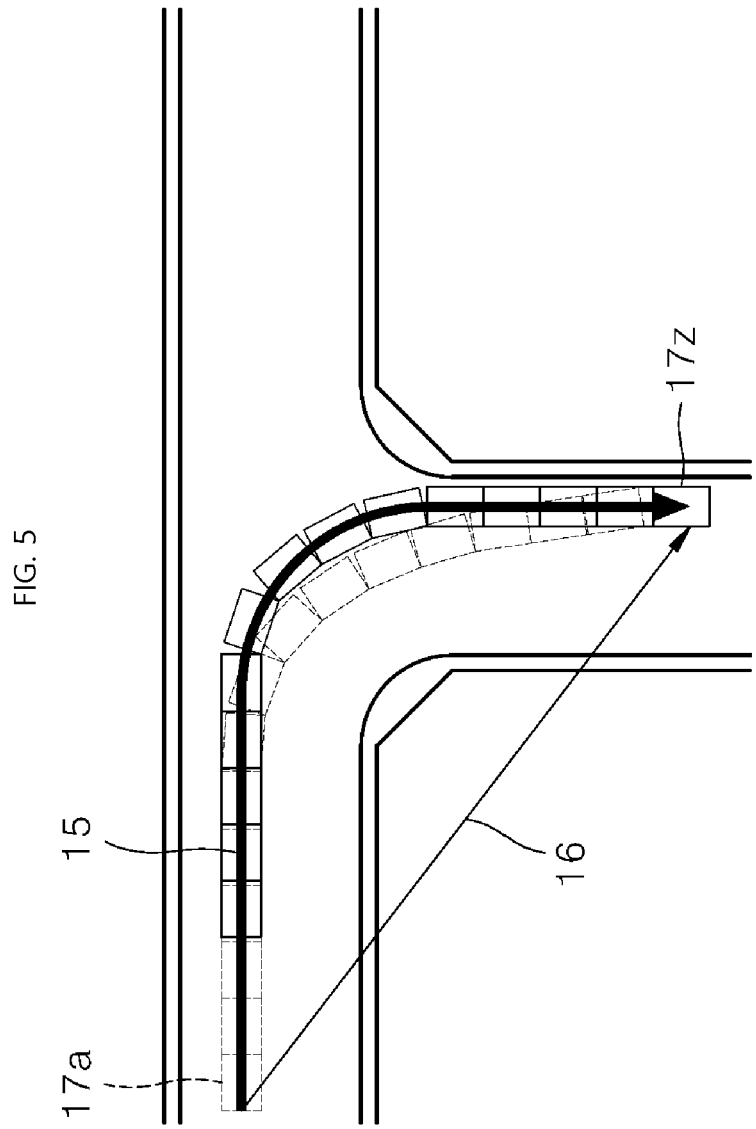
FIG. 5 shows a process in which a cart follows a user and moves according to an embodiment of the present disclosure.

FIG. 5 shows a process in which a cart moves while following a position of a user according to an embodiment of the present disclosure. The cart may not move a path having a shortest distance to follow the user, but may move by tracking a trajectory along which the user moves. Further, the cart checks the distance between the cart and the user and the direction of the user so that the cart is spaced apart from the user by a predetermine distance and stores the trajectory with respect to the movement of the user (the position information of the user).

In FIG. 5, a line indicated by reference numeral 15 refers to a trajectory along which the cart moves based on the movement of the user. Reference numeral 16 refers to a shortest distance from a starting point of the cart to the position of the user.

When the cart has not stored information on the movement trajectory of the user, the cart may move by the shortest distance from a point of reference numeral 17a to a current position 17z of the user. However, when the cart continually tracks and stores the movement trajectory of the user, the cart moves along the points. The case in which the cart moves to be closest to reference numeral 15 and the case in which the cart moves far away from reference numeral 15 may be provided in different manners based on the distance between the cart and the user corresponding to the position information of the user and the position of the obstacle.

As the user moves by avoiding the obstacles placed around the user, the cart may not collide with other obstacles when the trajectory of the user is accurately tracked. Therefore, in the embodiment of the present disclosure, the cart stores the position information of the user at short time intervals so that the position of the user may be tracked and the cart may move.

A distance between the transmission module and the cart may be divided into two types of distances. A minimum distance that may be maintained at least between the transmission module and the cart is referred to as "a minimum maintaining distance dist1".

A distance that may not be farther between the transmission module and the cart is referred to as "a maximum maintaining distance dist2. Accordingly, the cart may move closer to the transmission module by a shorter distance than dist2 as the transmission module moves, and the cart may maintain the distance to the transmission module so that the cart is not closer to the transmission module than dist1.

Figure 6:
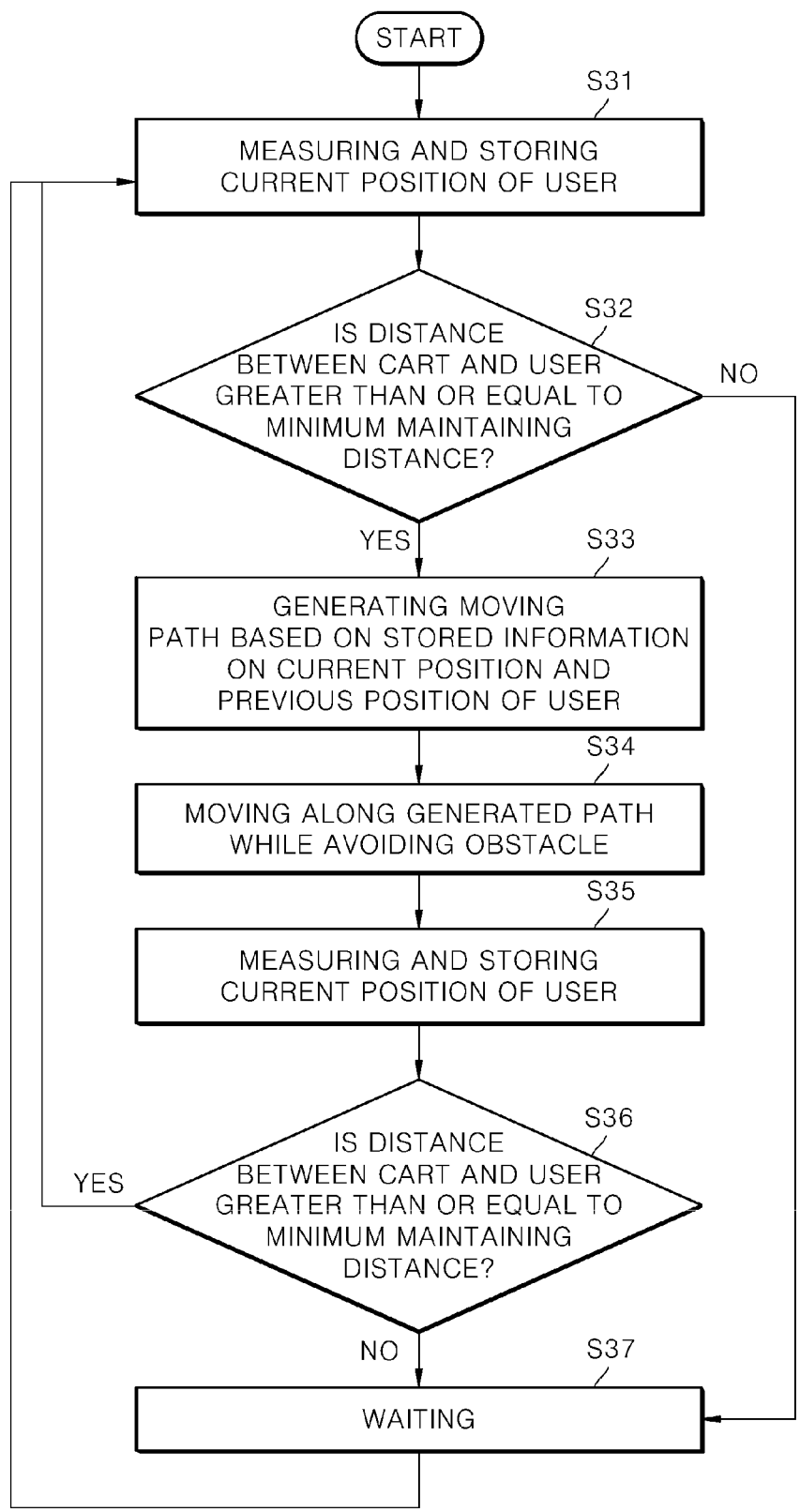
FIG. 6 shows a process in which a cart maintains a distance between the cart and a user and follows the user according to an embodiment of the present disclosure.

FIG. 6 shows a process in which a cart maintains a predetermined distance between the cart and a user and follows the user and moves while avoiding obstacles based on a moving path of the user. Even when the car may not move to maintain the predetermined distance between the cart and the user, a direction of moving the cart may be adjusted based on movement of the user.

FIG. 6 shows a process in which a controller 250 in a control module 150 of a cart 100 controls a positioning sensor 210 and an obstacle sensor 220 to control movement of the cart. As shown in FIG. 6, the process includes receiving, by the positioning sensor 210, a signal from a transmission module 500 and measuring the position of the transmission module 500 (S31), accumulatively storing, by the controller 250, position information of the transmission module 500 (S32), generating, by a controller 250, a moving path corresponding to the stored position information of the transmission module 500 (S33), and moving, by a driver 190, the cart 100 along a moving path of the transmission module 500 (S34).

The positioning sensor 210 measures the current position of the user, and the controller 250 stores the information on the current position of the user (S31). The controller 250 determines whether the distance between the cart and the user is greater than or equal to the minimum maintaining distance based on the current position of the user (S32). When the distance between the cart and the user is not greater than or equal to the minimum maintaining distance, the cart 100 waits (S37).

When the distance between the cart and the user is greater than or equal to the minimum maintaining distance, the controller 250 generates a moving path of the user based on the stored information on the current position and previous positions of the user (S33). The previous position is measured previously by the user, and the controller 250 may generate the moving path to follow the moving trajectory of the user based on one or more previous positions of the user and a current position of the user.

The cart avoids the obstacles and moves along the path generated through control of the controller 250 (S34). The positioning sensor 210 may continually measures the current position of the user and the controller 250 stores the measured current position of the user (S35).

The controller 250 determines whether the distance between the cart and the user is greater than or equal to the minimum maintaining distance based on the current position of the user (S36). As a result of determination in S36, when the distance between the cart and the user is greater than or equal to the minimum maintaining distance, S31 is performed. As a result of determination in S36, when the distance between the cart and the user is less than the minimum maintaining distance, the cart waits in S37.

The controller 250 may preset time intervals between S31 and S35, at which the current positions of the users are measured. Further, the controller 250 may increase or decrease the time interval between S31 and S35, at which the current positions of the users are measured based on the moving speed of the user.

Similarly, the controller 250 may also preset a waiting time in S37. Further, the controller 250 may increase or decrease this waiting time based on the moving speed of the user.

When the information on previous positions of the user is stored at short time intervals, the cart may accurately follow the trajectory of the user. Further, an example of accurately following the trajectory of the user may include the case in which the current position of the user and the position of the cart in the space is converted into the absolute coordinate to track the previous positions of the user, so that the cart move. When the information on the previous positions of the user is not stored, the cart may move by a shortest distance 16 as shown in FIG. 5, which causing the cart not to follow the trajectory of the user.

Figure 7:
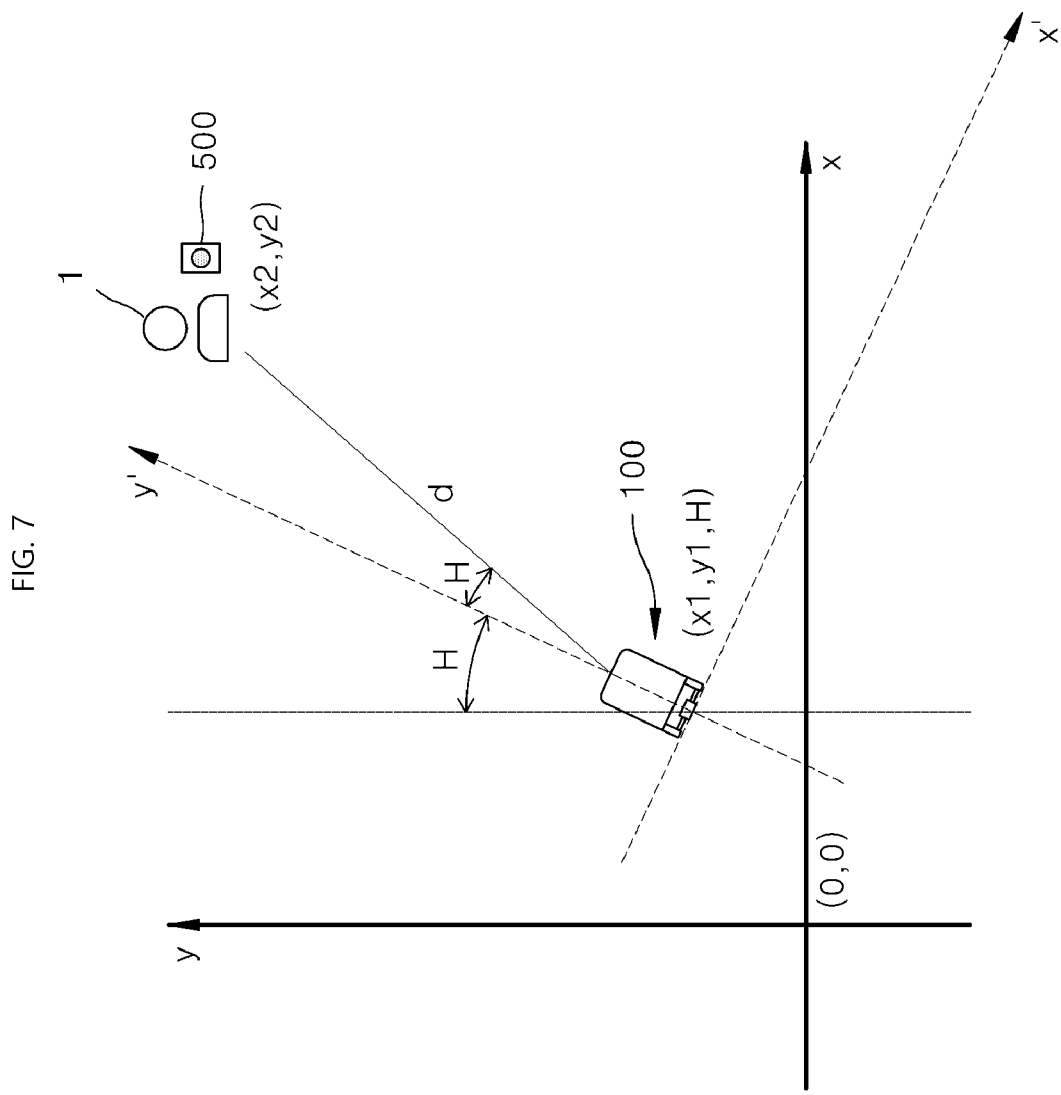
FIG. 7 shows a process of identifying, by a cart, an absolute position of a user according to an embodiment of the present disclosure.

FIG. 7 shows a process of identifying, by a cart, an absolute position of a user according to an embodiment of the present disclosure. A controller 250 of the cart may determine a moving distance using wheel odometry of a driver 190 based on an initial starting point of the cart or a predetermined point. As a result, position information of the cart (x1, y1) and a moving direction (H) of the cart is generated.

Distance d between the cart 100 and the transmission module 500 carried by the user 1 and angle θ between the cart 100 and the transmission module 500 carried by the user 1 are calculated by the positioning sensor 210 and a position corresponding to an absolute coordinate (x2, y2) of the transmission module 500, from a reference point, that is, an origin point, is calculated based on the position and the direction (x1, y1, H) of the cart.

The calculation process thereof is described in Equation 2.

$$x'_2 = d \sin\theta \quad \text{[Equation 2]}$$
$$y'_2 = d \cos\theta$$
$$\begin{pmatrix} x_2 - x_1 \\ y_2 - y_1 \end{pmatrix} = \begin{pmatrix} \cos H & -\sin H \\ \sin H & \cos H \end{pmatrix} \begin{pmatrix} x'_2 \\ y'_2 \end{pmatrix}$$
$$x_2 = d \sin\theta \cos H - d \cos\theta \sin H + x_1$$

-continued
$$y_2 = d \sin\theta \sin H + d \cos\theta \cos H + y_1$$

The controller 250 uses the distances d between the cart 100 and the transmission module 500 measured by the positioning sensor and angle θ between the cart 100 and the user and calculates a coordinate of (x'$_2$, y'$_2$) which is a relative coordinate with respect to a position and a direction of the cart (x1, y1, H) as shown in Equation 2. The absolute coordinate (x2, y2) of the transmission module 500 is calculated based on (x1, y1), H, and (x'$_2$, y'$_2$).

Equation 2 shows a process of calculating an absolute coordinate (x2, y2) of the transmission module 500 using distance d between the cart 100 and the transmission module 500 and angle θ, based on the relative coordinate (x', y') with respect to the position and the direction of the cart (x1, y1, H).

The controller 250 may generate the position of the user 1 as the position of the transmission module 500 which is identical to the position of the user 1.

However, when the transmission module 500 is carried on the wrist of the user, the transmission module 500 may swing constantly. Therefore, the controller 250 accumulatively measures the positions of the transmission module 500. When the transmission module 500 is repeatedly returned back to the previous position, for example, the distance to the transmission module 500 increases or decreases or the transmission module 500 laterally performs pendulum movement within a short distance (for example, an average stride of human body or a length of each of arms), the controller 250 determines the swing of the transmission module 500 by the user through repeated changes in position of the transmission module 500, thereby correcting the current position of the user. The controller 250 may use stored information on stored previous position of the user.

Figure 8:
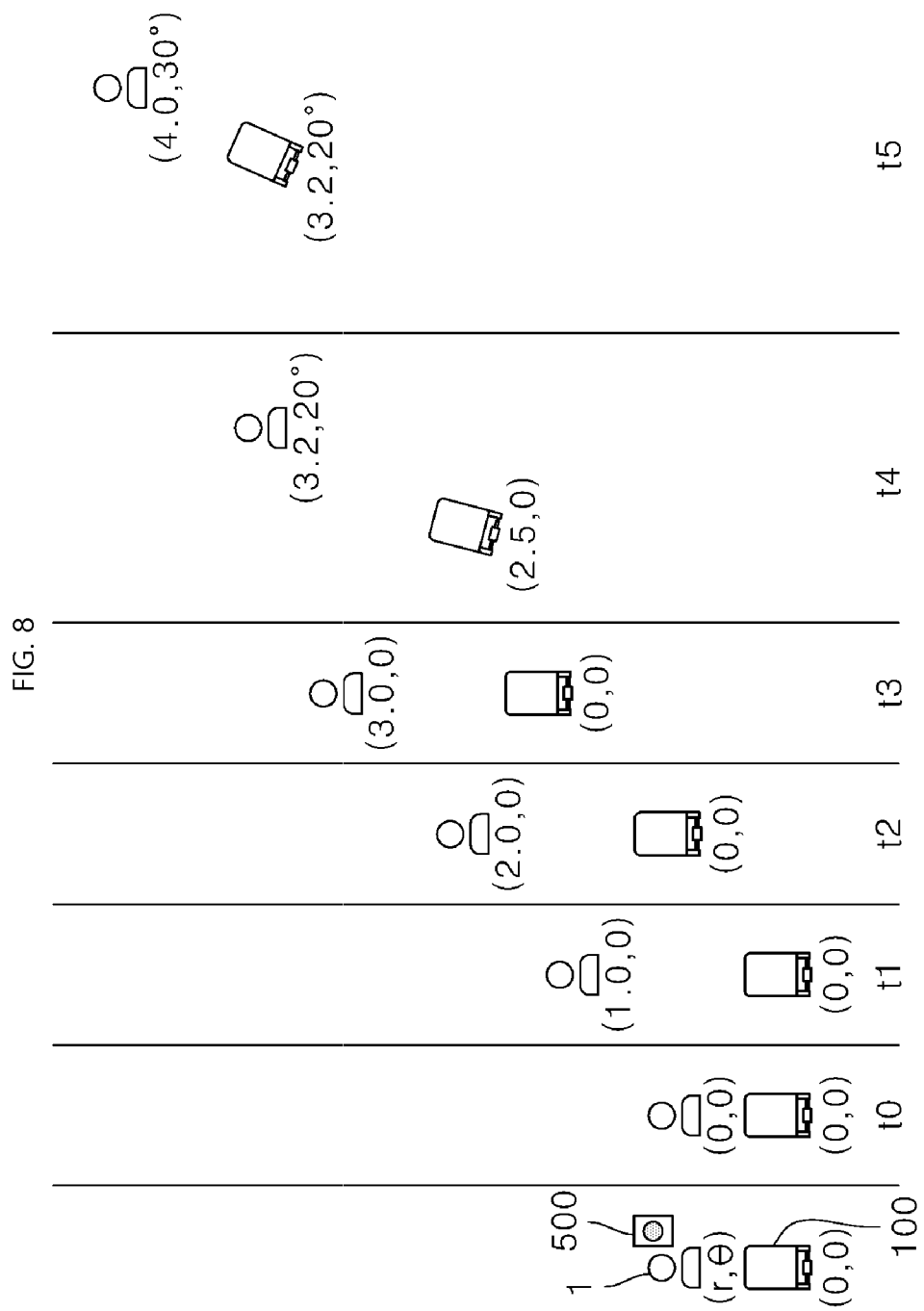
FIG. 8 shows a process of calculating a position of a user based on absolute coordinates and moving the cart when the cart follows a user according to an exemplary embodiment of the present disclosure.

FIG. 8 shows a process of calculating positions of users based on absolute coordinates when the cart follows a user and moving the cart according to an exemplary embodiment of the present disclosure. For convenience of description, at t0 to t5, a transmission module 500 is not additionally illustrated, and only a user 1 is shown at t0 to t5.

It is assumed that the transmission module 500 is also disposed at the position of the user. A position at which a cart 100 starts moving or a position which is reset at predetermined time intervals is (0, 0). The cart moves closer to the user so that a distance between an absolute position of the user (r, θ) and the cart 100 is equal to or less than a minimum maintaining distance dist1. As shown in FIG. 8, the minimum maintain distance (dist1) is 1.0.

At t0, t1, t2, t3, t4, and t5, positions of the cart 100 and the transmission module 500 carried by the user and position information thereof based on the positions of the cart 100 and the transmission module 500 are provided at every time interval. The position information includes information on an absolute distance and an absolute angle calculated by a controller 250 of the cart 100. The information on the absolute distance and the absolute angle are calculated based on a reference point or an origin point and are includes (a distance, an angle). According to another embodiment, the position information may include information on (x, y, angle) of the cart 100 and the transmission module 500.

The cart starts moving at t0, the cart 100 and the transmission module 500 have information on the same position.

At t1, the transmission module 500 has moved by a distance of 1.0 and 0 degree of the angle is maintained. At t1, the distance between the cart 100 and the transmission module 500 is 1.0 and the cart 100 moves toward the transmission module 500 so that the distance between the cart 100 and the transmission module 500 is less than or equal to the minimum maintaining distance.

At t2, the position of the transmission module 500 corresponding to a distance of 2.0 based on an origin point (a reference point), and the position of the cart 100 corresponds to a distance of 1.0 based on the origin point. As the cart 100 and the transmission module 500 has moved straight, an angle of the cart 100 and an angle of the transmission module 500 are all 0 degree. In t2 and t3, the cart 100 moves straight toward the transmission module 500.

At t4, a distance between the user and the origin point is 3.2 and the transmission module 500 is inclined rightward with respect to the cart 100 by 20 degrees. At t4, the cart moves, from 0 degree, to a position inclined rightward with respect to the cart 100 by 20 degrees. The angle of the cart 100 is 0 degree.

At t5, the cart 100 has moved to the position of the user corresponding to the position at t4, based on the position information (3.2, 20°) of the user at t4. The user moved to (4.0, 30°). That is, the user has moved at an angle of 30° with a distance of 4.0 with respect to the origin point. Accordingly, the cart 100 moves, from the position of (3.2, 20°) at t5, toward the current position of the user.

In an example in FIG. 8, the cart 100 identifies the position of the transmission module 500 based on a predetermined time interval (3 seconds, 1 second, 0.5 seconds, and the like), and converts the position of the transmission module 500 into absolute coordinates and move toward the position of the user. As the position of the transmission module 500 is identified at every time interval the cart 100 moves, the cart 100 may move closer to a moving path of the user.

In particular, the cart 100 generates a moving path based on the position information (an absolute coordinate at t0) at a particular time point including the position of the cart 100 and the position of the transmission module 500. As a result, the cart 100 stores the changed position of the transmission module 500 based on the absolute coordinate, the cart 100 may move along the moving path of the user.

The position of the cart and the position of the user are calculated based on an initial starting point (an origin point), and the cart may travel so that the position (r, θ) of the cart is closer to the position (R, H) of the user. The R refers to information on a distance based on the starting point among the position information of the user. H refers to information on an angle based on a starting point among the position information of the user.

Figure 9:
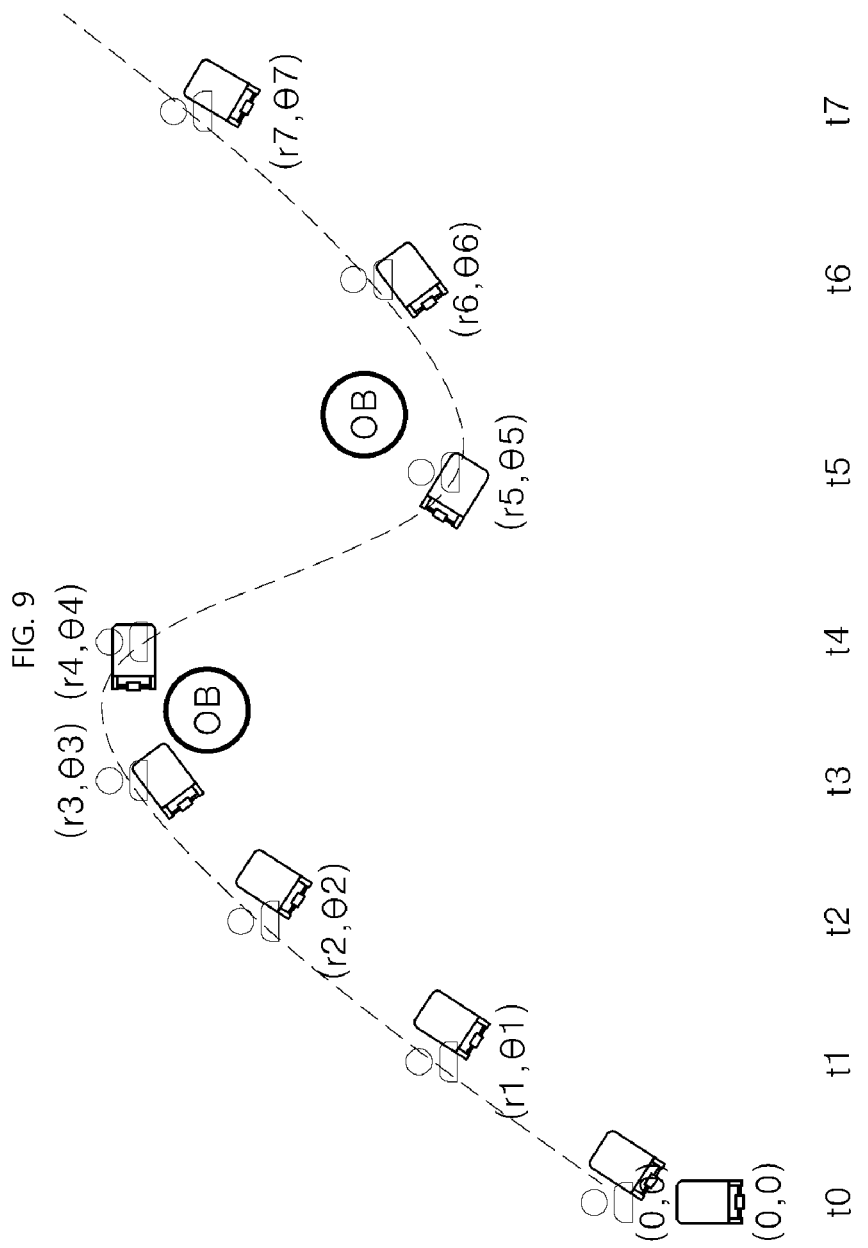
FIG. 9 shows a process in which a cart follows a transmission module and moves according to an embodiment of the present disclosure.

FIG. 9 shows a process in which a cart follows a transmission module and moves according to an embodiment of the present disclosure. When the cart follows a transmission module based on absolute coordinates, the cart stores information on a moved position of a user and moves based on the information on the moved position of the user, thereby reducing a possibility of collision between a cart 100 and an obstacle OB.

A cart 100 continually stores the information on positions of the user, for example, (0, 0), (r1, θ1), (r2, θ2), . . . , (r7, θ7) and generates a path. As a result of generation of the path, the cart 100 moves close to the path along which the user has moved, that is, the path along which the transmission module 500 has moved. As a result, the cart 100 may also move while avoiding obstacles OB, and the obstacle OB was avoided by the user when the user moves.

As shown in FIGS. 8 and 9, the controller 250 stores information on a reference point to calculate positions of the cart 100 and the transmission module 500. The position of the cart 100 is calculated with respect to a reference point, based on the moving distance and the direction of the driver 190.

Further, as shown in FIGS. 3 and 4, the positioning sensor 210 calculates the position of the transmission module 500 based on the position of the cart 100.

The controller 250 calculates the position of the transmission module 500 based on the reference point and the cart 100. The controller 250 stores the generated position information related to the transmission module 500. As a result, as shown in FIG. 9, the cart 100 may move by following a path along which the user moves.

To this end, the controller 250 accumulatively stores the position information related to the transmission module 500. That is, the controller 250 generates a moving path based on two or more kinds of position information, and the controller 250 controls the movement 100 so that the cart 100 moves along the generated moving path.

As shown in FIGS. 8 and 9, when the position information related to the transmission module 500 is not stored based on absolute coordinates with respect to the origin point, the position between the cart 100 and the position of the transmission module 500 are relatively set during movement of the user. Thus, the cart 100 may not move along the path of the transmission module 500, but may generate the path based on a final position of the transmission module 500, so that the cart 100 may not avoid the obstacle. The above matter is described in more detail.

Figure 10:
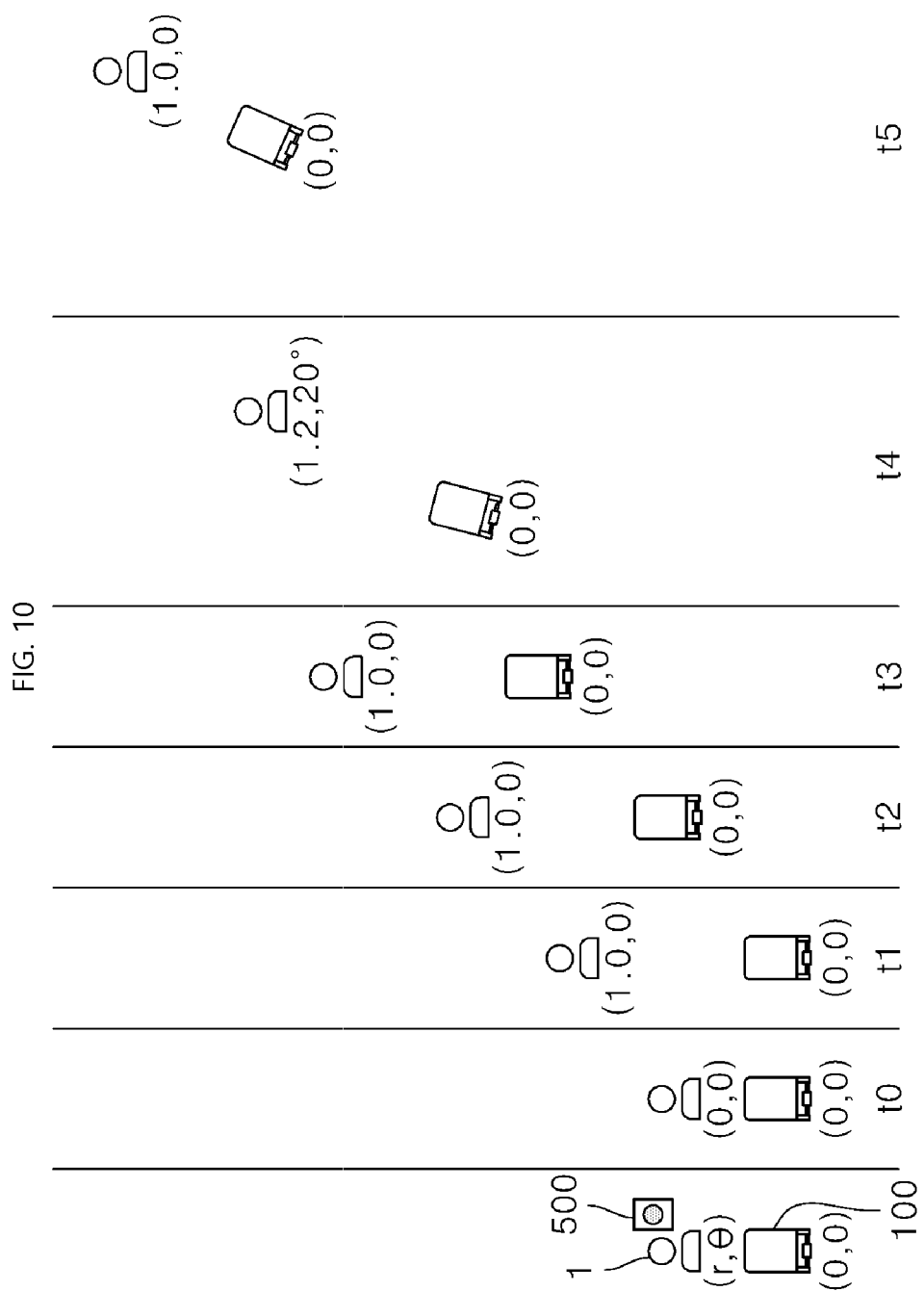
FIG. 10 shows an example in which a cart stores position information of a transmission module based on relative coordinates so that FIG. 10 may be compared with FIG. 8.

FIG. 10 shows an example in which a cart stores position information of a transmission module using relative coordinates so that FIG. 10 may be compared with FIG. 8. A cart 100 may calculate a distance between the cart 100 and a transmission module 500 and may travel so that the cart 100 is closer to (1.0, 0°)

As a result, at each of t1 to t3, a distance between a current position of the cart 100 and the transmission module 500 and an angle are calculated, by the cart 100, as (1.0, 0°), which corresponds to information generated based on a current position of the cart 100. Further, the cart 100 calculates the position and the angle of the cart as (0, 0°). The cart travels such that the position information (r, θ) of the sensed by transmission module 500 is close to (1.0, 0°).

Figure 11:
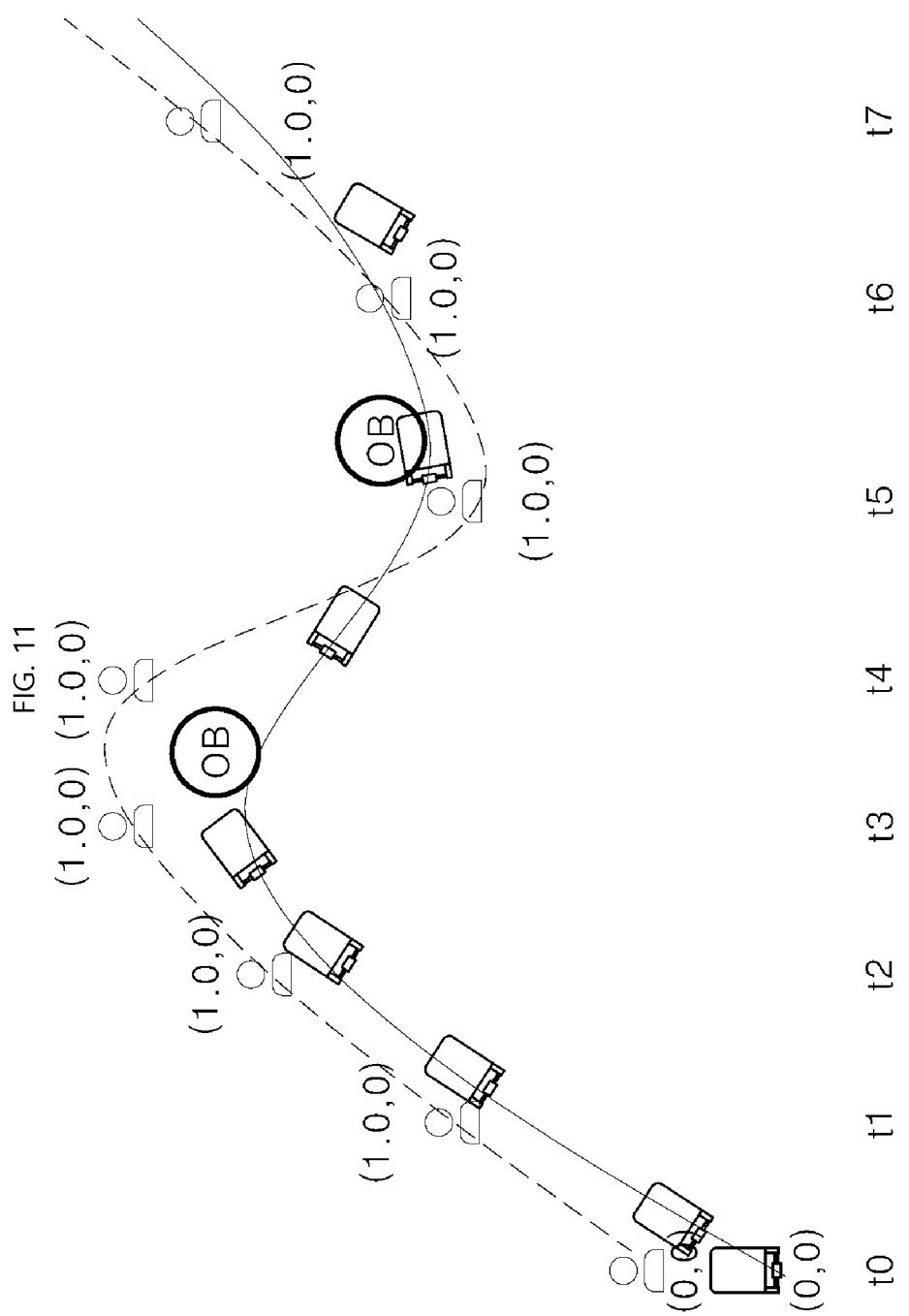
FIG. 11 shows a path in which a cart stores position information of a transmission module based on relative coordinates and moves so that FIG. 11 may be compared with FIG. 9.

FIG. 11 shows a path in which a cart stores position information of a transmission module using relative coordinates and travels so that FIG. 11 may be compared with FIG. 9.

When the cart follows the user based on the relative coordinates, the user moves along dotted lines to avoid an obstacle (OB). However, as a result determination of the position of the user based on a final position and a relative position of the user, the cart 100 moves along a solid line and may collide with the obstacle (OB).

That is, when the cart follows the movement of the user using relative coordinates, the cart may collide with an obstacle, so that the cart may not follow the movement of the user.

Figure 12:
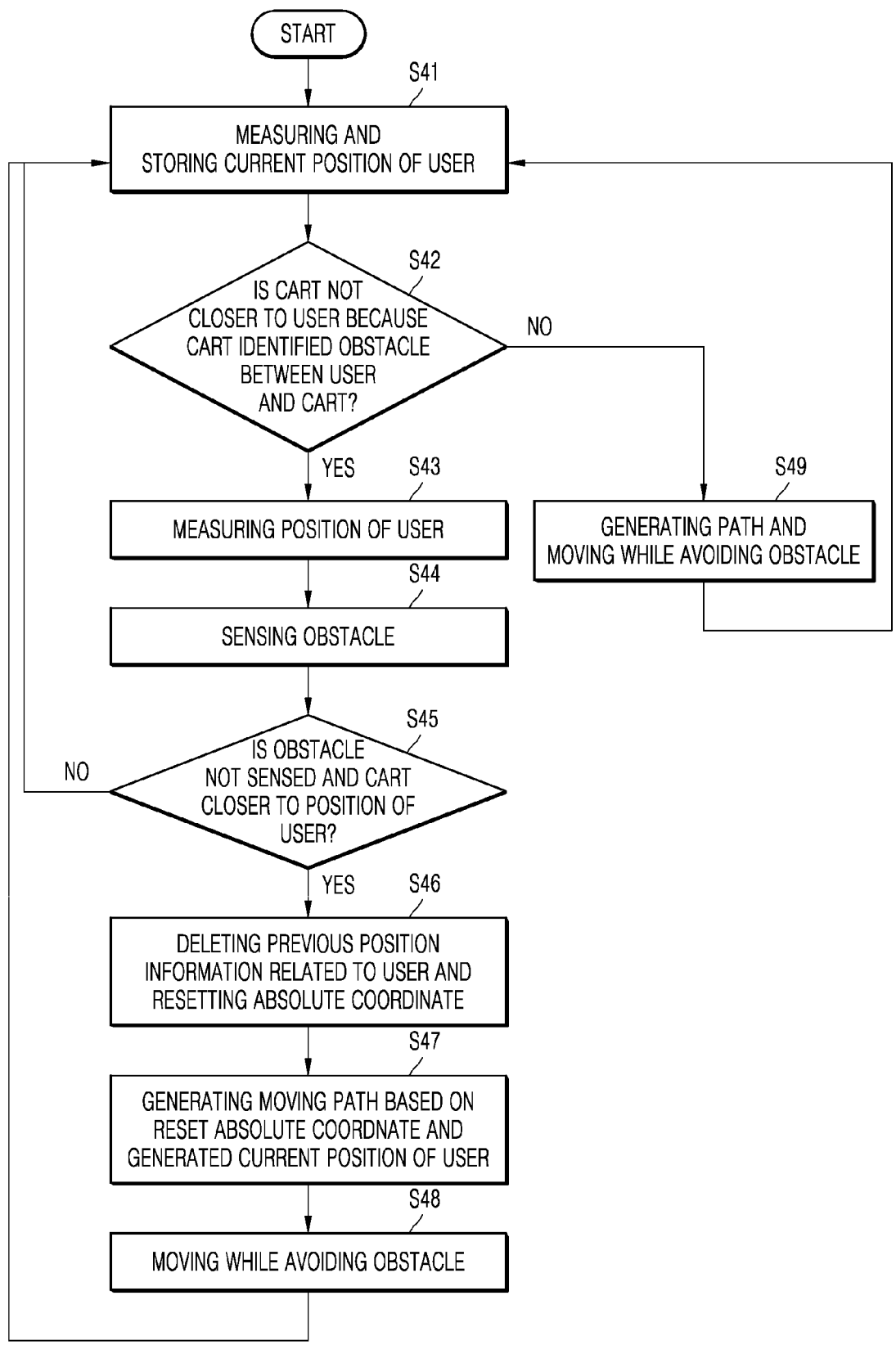
FIG. 12 shows a process of reconfiguring absolute coordinates according to an embodiment of the present.

FIG. 12 shows a process of reconfiguring absolute coordinates according to an embodiment of the present disclosure. In one embodiment, a controller 250 may store a lot of position information of the transmission module together with time information, and may delete, from the position information, the position information at which the cart 100 does not arrive for a period of time, in order of time.

The controller 250 generates a moving path as close as possible to the position of the transmission module, but when the cart 100 does not arrive at the position of the transmission module for a predetermine period of time (e.g., a time reference such as 1 minute or 5 minutes), the position information of the transmission module 500 is reset so that the cart 100 may track a current position of the transmission module, rater than may follow previous positions of the transmission module 500.

The controller 250 in a control module 150 of the cart 100 controls a positioning sensor 210 and an obstacle sensor 220 to control movement of the cart. When the cart may not move due to the obstacle, the control module 150 reconfigure the absolute coordinate for a predetermined period of time and based on a predetermined distance.

The positioning sensor 210 measures the current position of the user based on the position of the transmission module 500, and the controller 250 stores information on the current position of the user (S41). Further, the obstacle sensor 220 identifies the obstacle placed between the user and the cart 100 and the controller 250 determines whether the cart 100 may not approach to the user (S42). As a result of determination whether the cart 100 may approach to the user, the controller 250 generates a path thereof and moves the cart while avoiding the obstacle (S49).

When the cart 100 may not move to a periphery of the user due to the obstacle in S42, the controller 250 controls the positioning sensor 210, the obstacle sensor 220, and the like, to measure the position of the user (S43), and senses an obstacle (S44). In this process, when the obstacle may not be sensed and the cart 100 is close to the position of the user (S45), the controller 250 deletes the previous position information of the user and resets the absolute coordinate thereof (S46). The controller 250 generates a moving path based on the reset absolute coordinates and the calculated current position of the user (S47). The controller 250 avoids obstacles and moves the cart 100 along the path (S48).

In S45, when a case in which the cart 100 is close to the position of the user refers a case in which the cart 100 is closer to the current position of the user based on comparison with position information related to the user, continually stored by the controller 250. For example, the controller 250 stores the position information of the user for a predetermined period of time. When the cart 100 is closer to the user than the measured position of the user, the cart may not move based on information on previous positions of the user.

Therefore, the controller 250 deletes previously stored position information and reconfigures the absolute coordinate. In one embodiment, the absolute coordinate is reset and the current position of the cart 100 is set as the origin point. Meanwhile, the obstacle is still sensed in S45, S41 is performed.

As shown in FIG. 12, an obstacle is disposed between a user and a cart for a predetermined period of time (e.g., 10 seconds) and the cart may not move, the cart does not have to move while following previous moving path of the user. Thus, when the cart may not move during the predetermined period of time or the user moves closer to the cart for the predetermined period of time, the controller 250 may delete the stored position information related to the user so that the cart may not follow the previous moving path of the user and may move to the measured current position of the user and may reconfigure an absolute coordinate.

When the above-described embodiment is applied, the position of the transmission module 500 carried by the user is measured and the coordinate of the transmission module 500 is converted into the absolute coordinate and the path along which the cart follows is generated, so that the cart 100 may move along the user. In one embodiment, a technology for positioning based on UWB may be used for the cart 100.

Figure 13:
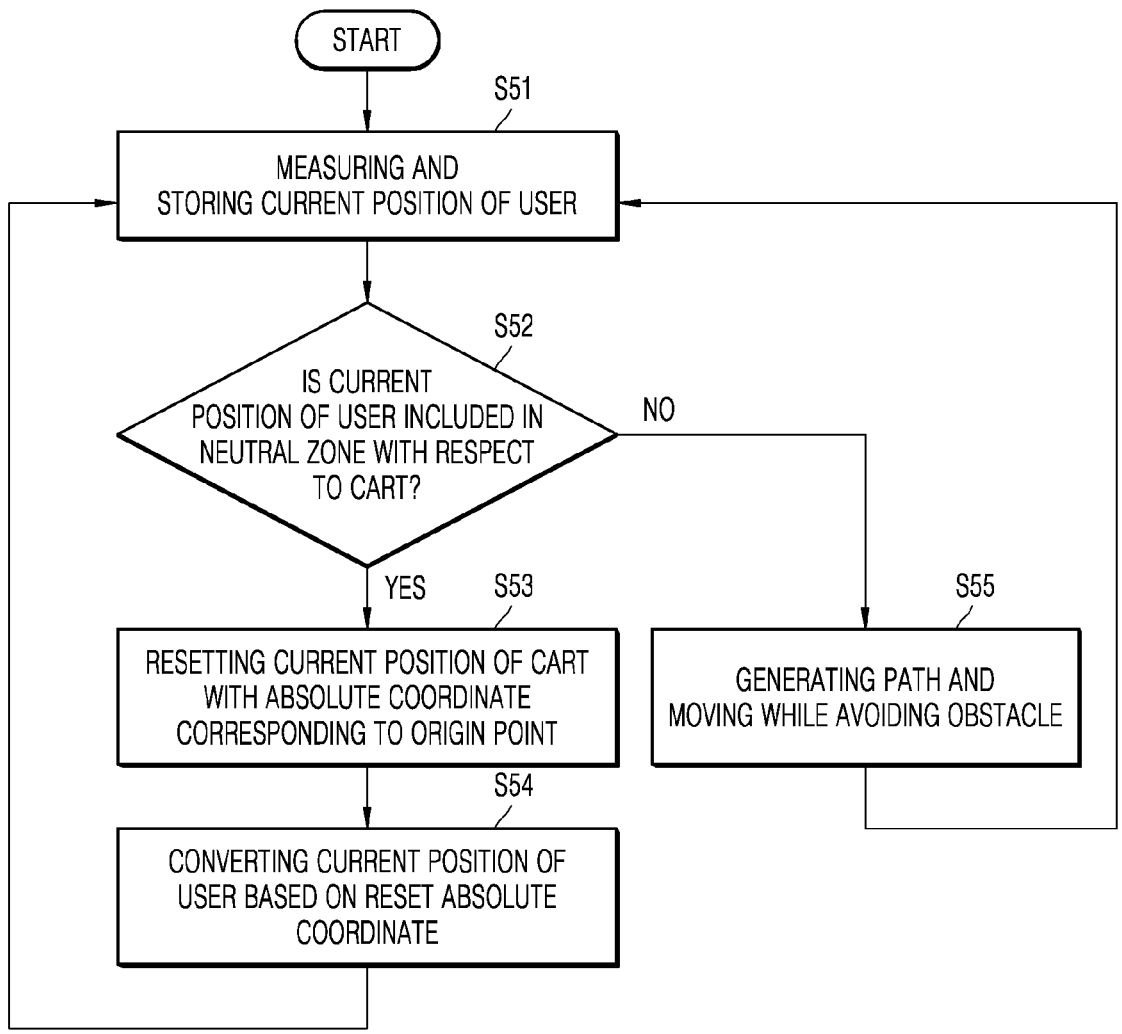
FIG. 13 shows a process of resetting absolute coordinates when a distance between a transmission module and a cart is within a predetermined range according to an embodiment of the present disclosure.

FIG. 13 shows a process of reconfiguring absolute coordinates when a distance between a transmission module and a cart is within a predetermined range according to an embodiment of the present disclosure.

A positioning sensor 210 measures a current position of a user using a transmission module 500, and a controller 250 stores information on the current position of the user (S51). Further, the controller 250 determines whether the current position of the user is included in a neutral zone, with respect to the cart 100 (S52).

The neutral zone refers to an area where the cart 100 is not moved because the cart 100 is closer to the user, that is, the transmission module 500, based on comparison of the current position of the cart 100 with the current position of the user, that is, the current position of the transmission module 500. For example, when the current position of the user, that is, the current position of the transmission module 500 is within a radius of 50 cm or 1 m of the cart 100, the cart 100 may not move and may only measure the position of the user.

When the user is located in the neutral zone, the controller 250 resets the current position of the cart as an absolute coordinate corresponding to the origin point (S53). As a result, an error, a direction error, and the like, which occur during accumulation of the moving distance of the wheel when the cart 100 moves, and the controller 250 may improve accuracy in measurement of the position of the user and generation of the moving path. In particular, when the user moves along a path in a state in which the cart may not move due to the obstacle, and the cart is close to the user and the user is placed in the neutral zone, the controller 250 resets the current position of the cart as the absolute coordinate corresponding to the origin point, thus, the cart 100 may not unnecessarily move along the previous path of the user.

That is, the cart 100 reconfigure the absolute coordinate based on a predetermined reference and to reconfigure the position of the cart 100 and the position of the user. As a result, the cart 100 may follow the moving path of the user and the cart may not move along an unnecessary path, in the moving path of the user, thereby increasing an efficiency of moving the cart 100.

After the absolute coordinates are set, the controller 250 converts the current position of the user based on the reset absolute coordinates (S54). S51 is performed.

On the other hand, when the user is not located in the neutral zone in S52, a path to a current position of the user is generated and the cart moves while avoiding the obstacle (S55).

When the above-described embodiment is implemented, the cart 100 may travel along the moving path of the user. In particular, information on the moving position of the user is stored in the cart 100 at each time point based on the absolute coordinates. The controller 250 generates a path to connect the moving positions of the user.

The controller 250 controls the cart 100 to move along the moving path in which the cart 100 follows the movement points of the user, rather than a moving path having a shortest distance, and the cart 100 moves toward a final position of the user along the moving path having the shortest distance.

In an embodiment, the positioning sensor 210 may use positioning using UWB. Further, the controller 250 may control the wheel odometry of the driver 190 to determine the moving distance and the moving direction of the cart 100. Further, during reset of the origin point, the controller 250 may reset the information accumulated during using of the wheel odometry.

As position information of the user is stored in the cart 100 based on the absolute coordinates for a predetermined period of time, the cart 100 may move while following the moving path of the user. Further, as the absolute coordinate is reset based on the predetermined reference, an error rate accumulated during the movement of the cart 100 is lowered.

Further, an interface 230 in the cart 100 may provide visual information regarding the movement of the cart 100. For example, the interface 230 may include blinkers that blink based on a brake signal when the cart 100 stops while moving.

When the distance between the user and the cart 100 is greater than a predetermined distance, the user may be notified of a situation in which the cart 100 is placed far away from the user, through the transmission module 500 carried by the user. For example, the transmission module 500 includes the interface and the distance between the cart 100 and the user is greater than the predetermined distance (e.g., 4 m), the interface may perform a function for vibration or a function for flickering a light.

Further, as the cart 100 follows the moving path of the user, congestion may be reduced in a greater space where a large number of people move, for example, a mart. The moving path of the user is generated to avoid the space having congestion during movement of the users, the cart 100 may move while following the user, to reduce the congestion.

In FIGS. 12 and 13, the controller 150 may reconfigure the position of the cart 100 based on a reference point to generate the position information of the transmission module 500 and the cart 100 (information on the absolute position) using any one of the distance between the cart 100 and the transmission module 500 or a period of time for which the cart 100 may not move due to the obstacle, thereby resetting the position corresponding to the error accumulated during movement.

Figure 14:
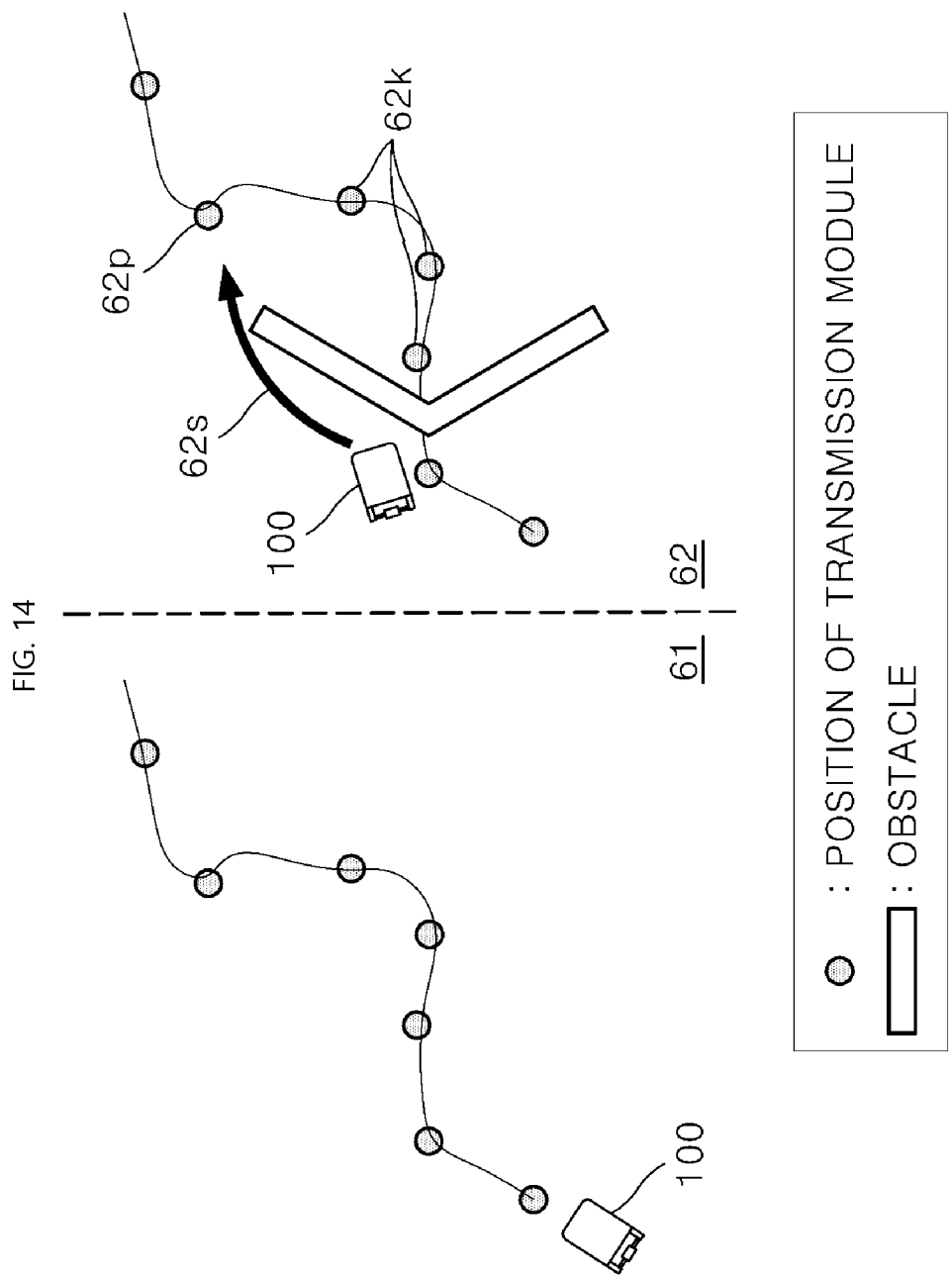
FIG. 14 shows a process of reconfiguring a path by avoiding obstacles during movement of a cart based on absolute coordinates according to an embodiment of the present disclosure.

FIG. 14 shows a process of resetting a path while avoiding obstacles during movement of a cart based on an absolute coordinate according to an embodiment of the present disclosure. A cart 100 stores position information of a transmission module shown in reference numeral 61. A controller 250 stores the position information of the transmission module based on the absolute coordinate and generates the path along which the cart moves based on positions of the transmission module.

First, steps performed in reference numeral 61 are summarized as follows.

The controller 250 stores information on a reference point to calculate positions of the cart 100 and the transmission module 500. The controller 250 calculates the position of the cart 100 with respect to a reference point based on a moving distance and a direction of the driver 190.

Thereafter, the positioning sensor 210 calculates the position of the transmission module 500 based on the cart 100. The controller 250 generates the position information of the transmission module 500 based on the reference point and the position of the cart 100. The controller 250 may store the generated position information of the transmission module 500 and may generate the moving path thereof. In reference numeral 61, the moving path thereof is generated based on the stored position information. In this case, the moving path is generated based on two or more kinds of stored position information of the transmission module 500.

In reference numeral 62 in FIG. 14, an obstacle is identified during movement of the cart 100 along the moving path indicated by a solid line. That is, the obstacle sensor 220 senses the obstacle disposed along the moving path. As a result, the controller 250 controls the driver so that the cart 100 deviates from the moving path to avoid the obstacle (62s).

Further, the controller 250 generates the moving path thereof based on the position 62p at which the cart 100 may closely access while avoiding the obstacle, among two or more kinds of information on positions of the transmission module. The controller 250 deletes the position information 62k at which the cart 100 may not arrive, thereby preventing the unnecessary moving path from being generated.

During the controlling process of the driver 190 by the controller 250, controller 250 may compare the point at which the driver 190 moves with the position corresponding to the stored position information of the transmission module and may delete, when the driver 190 approaches at the position information by a predetermined distance or less (e.g., 50 cm and 1 m). The cart 100 may avoid the obstacle during moving of the cart 100 along the moving path generated based on the position information related to the transmission module. In this process, even when the cart 100 deviates from the moving path with a slight difference, the controller 250 may determine that the cart 100 arrived at the position corresponding to the previous position information related to the transmission module, thereby preventing the unnecessary moving path from being generated.

Figure 15:
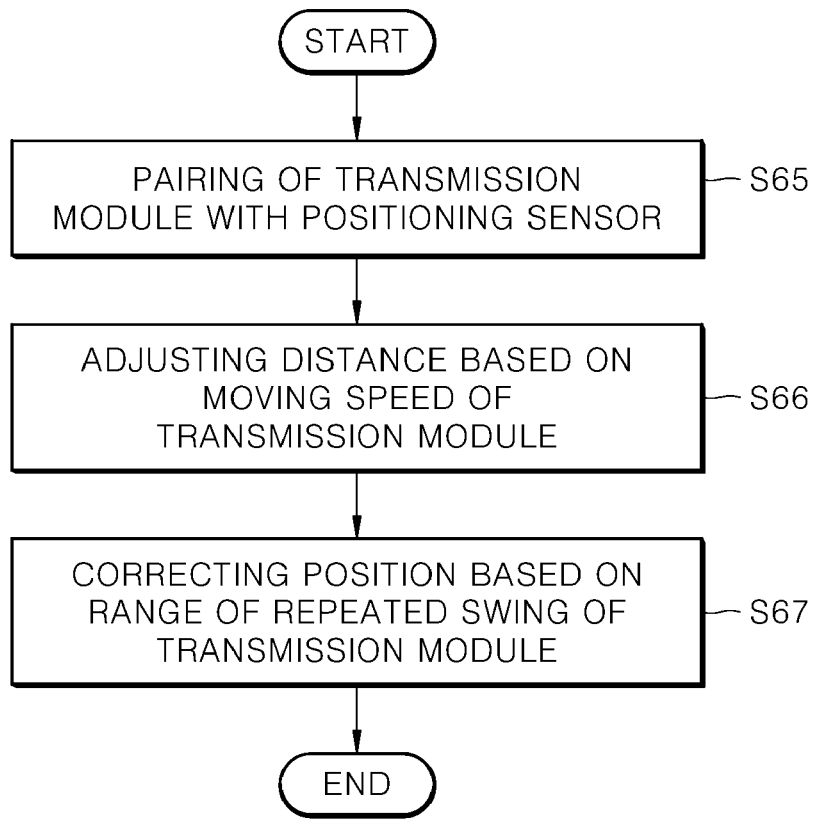
FIG. 15 shows a process of performing, by a controller, pairing with a transmission module and adjusting set information based on a moving speed of a user or a tendency of movement of the user.

FIG. 15 shows a process of adjusting, by a controller, setting information based on a moving speed or a moving tendency of a user after pairing with a transmission module according to an embodiment of the present disclosure.

A controller 250 performs pairing of a transmission module 500 and a positioning sensor 210 (S65). The controller 250 adjusts a distance between the transmission module 500 and the cart 100 based on the moving speed of the transmission module 500. In one embodiment, when the moving speed of the transmission module 500 is fast, the controller 250 may greatly increase a distance, that is, a minimum maintaining distance (dist1) between the transmission module 500 and the cart 100, which may be maintained at a minimum of distance.

Further, the controller 250 may reduce a maximum maintaining distance (dist2) between the transmission module 500 and the cart 100, which may not be spaced.

In another embodiment, when the transmission module 500 has slow moving speed, the setting may be performed in a different manner from the above-described method. Alternatively, the controller 250 may adjust the minimum maintaining distance and the maximum maintaining distance based on distribution of obstacles in the space.

Further, the controller 250 may also adjust the time interval to store the position information related to the transmission module 500 based on the moving speed of the transmission module 500.

Further, the controller 250 may correct and store the position information of the transmission module 500 based on a range in which the transmission module 500 swings repeatedly (S67). For example, when the transmission module 500 is attached to the wrist of the user, the transmission module 500 may swing forward and rearward or leftward or rightward, during walking while shaking arms of the user.

Therefore, when the position of the transmission module 500 is repeatedly changed in a predetermined portion of human body, the controller 250 may calculate a median value or an average value of the position of the transmission module 500 to correct and store the position information related to the transmission module.

Figure 16:
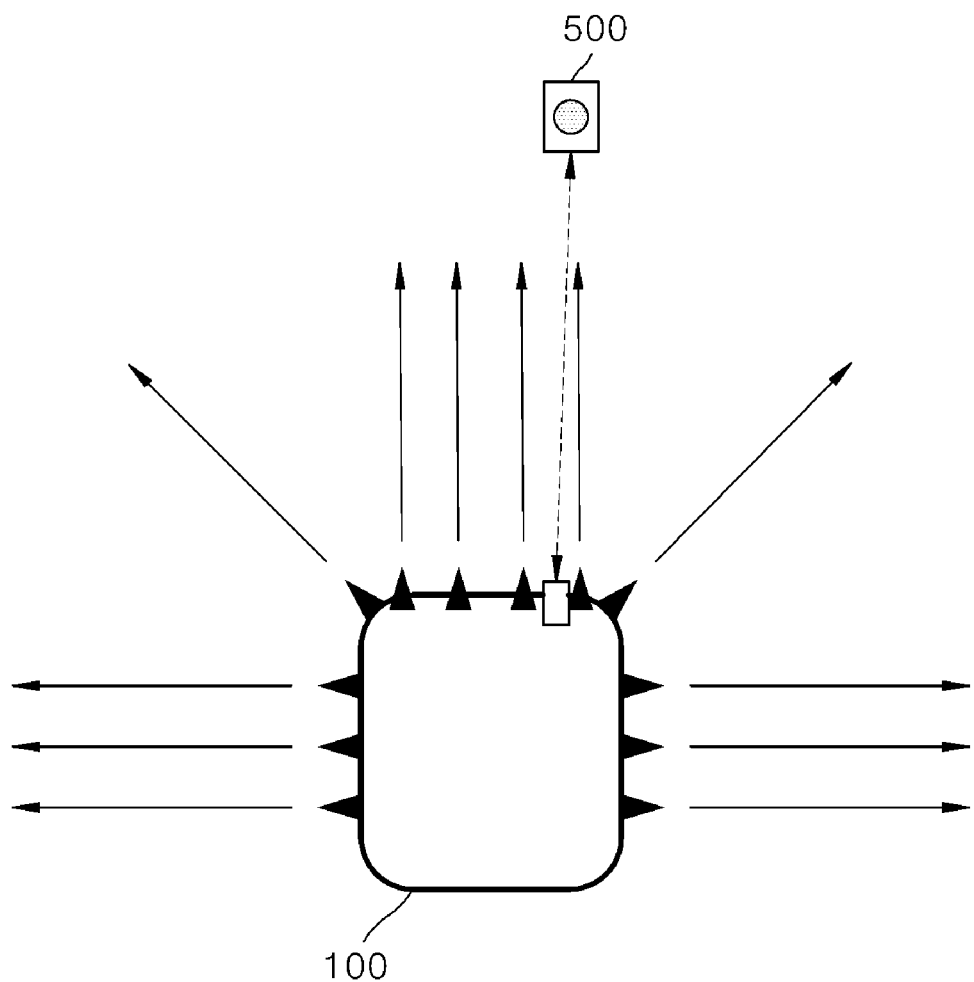
FIG. 16 shows sensing ranges and directions of a positioning sensor and an obstacle sensor disposed in a cart according to an embodiment of the present disclosure

FIG. 16 shows sensing ranges and directions of a positioning sensor and an obstacle sensor disposed in a cart according to an embodiment of the present disclosure. As an arrow including dotted lines is shown, a positioning sensor 210 measures a position of the transmission module 500. As arrows including solid lines are shown, a plurality of obstacle sensors 220 sense the obstacle placed at positions corresponding to a front direction, a direction of both sides, and a diagonal direction, of a cart 100.

When many obstacles are detected, the controller 250 may adjust the distance between the transmission module 500 and the cart 100. Alternatively, the controller 250 may adjust the moving speed of the cart 100.

When the above-described embodiment is applied, the cart 100 senses the position of the transmission module 500 based on the absolute coordinate of the user and convert it into the absolute coordinate, and stores the position information for each predetermined period of time. The stored position information related to the transmission module 500 is used to generate the moving path of the cart. When the obstacle is placed between the cart 100 and the transmission module 500, the cart 100 may move along the general path so that the cart 100 may be closer to a moving trajectory of the transmission module 500 while avoiding the obstacle.

Further, an error rate thereof may be lowered by resetting the positions of the cart 100 and the transmission module 500 as an origin point which is a reference to generate the absolute coordinate of the cart 100 and the transmission module 500.

When the embodiment of the present disclosure are applied, when the distance between the user and the cart is within a predetermined range, the position of the cart is initialized based on absolute coordinates, so that the error accumulated based on the position of the cart and the position of the user is repeatedly removed, thereby enabling the cart to accurately follow the user.

When the embodiment of the present disclosure is applied, even when error in the moving distance and the direction of the cart may occur due to degraded accuracy in the signal occurring when a lot of users and carts are placed in the space, and collision between the carts, the cart reconfigures the position of the cart and the position of the user based on the repetitive absolute coordinate, so that the cart 100 may accurately follow the user.

When the embodiment of the present disclosure is applied, error occurring when the position is measured by initializing the absolute coordinated based on the distance between the user and the cart, and physical error occurs with respect to the moving distance and the direction thereof are reduced to improving accuracy in movement of the cart.

Although components included in the exemplary implementation of the present disclosure are described as being combined to one, or as being coupled to operate, such exemplary implementation is not necessarily limited to this specific example, and these components may be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a lot of hardware. Codes and code segments that are included in the computer program may be easily deduced by those skilled in the art of the present disclosure. The computer program may be stored in computer readable media that a computer may read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program module that is transmitted in real time through an external apparatus.

While the present disclosure has been mainly described referring to the exemplary embodiment of the present disclosure hereinabove, various modifications and changes may be made at the level of those skilled in the art. Therefore, unless such a modification and change do not deviate from the range of the present disclosure, it will understand that they are included in the scope of the present disclosure.

The invention claimed is:

1. A cart for following a transmission module, the cart comprising:
    a positioning sensor configured to receive a signal from the transmission module and measure a position of the transmission module;
    an obstacle sensor configured to sense an obstacle disposed around the cart;
    a controller configured to:
        accumulatively store position information of the transmission module based on the position of the transmission module measured by the positioning sensor, and
        generate a moving path corresponding to the position information of the transmission module; and
    a driver configured to move the cart along the moving path,
    wherein the controller is further configured to:
    perform pairing between the transmission module and the positioning sensor, and
    adjust a distance between the transmission module and the cart based on a moving speed of the transmission module.

2. The cart according to claim 1, wherein the controller is further configured to:
    store information on a reference point to calculate a position of the cart and the position of the transmission module, and
    calculate the position of the cart with respect to the reference point based on a moving distance of the driver and a moving direction of the driver,
    wherein the positioning sensor is further configured to calculate the position of the transmission module based on the position of the cart, and
    wherein the controller is further configured to generate the position information of the transmission module based on the reference point and the position of the cart and store the position information of the transmission module generated based on the reference point and the position of the cart.

3. The cart according to claim 1, wherein the controller is further configured to:
    generate the moving path based on two or more kinds of stored position information of the transmission module and control the driver to move the cart along the moving path generated based on the two or more kinds of stored position information.

4. The cart according to claim 3, wherein the controller is further configured to:

when the obstacle sensor senses the obstacle provided in the moving path, control the driver to deviate the cart from the moving path to avoid the obstacle, and
generate an updated moving path including a point corresponding to a position at which the cart is able approach the transmission module.

5. The cart according to claim 3, wherein the controller is further configured to:
compare a moved point of the driver controlled by the controller with the position information, and
in response to the cart being within a predetermined distance or less of a position corresponding to the position information, delete the position information.

6. The cart according to claim 1, wherein the controller is further configured to:
when the cart does not arrive at a position corresponding to the position information of the transmission module after a predetermined period of time, delete the position information of the transmission module.

7. The cart according to claim 1, wherein the controller is further configured to:
reset a position of the cart based on a reference point to generate the position information based on at least one of a distance between the cart and the transmission module or a period of time for which the cart is immobile due to the obstacle.

8. The cart according to claim 1, wherein the controller is further configured to:
correct the position information of the transmission module based on a range in which the transmission module repeatedly swings to generate corrected position information of the transmission module, and
store the corrected position information of the transmission module.

9. A method for controlling a cart to follow a transmission module, the method comprising:
receiving, by a positioning sensor of the cart, a signal from the transmission module and measuring a position of the transmission module;
accumulatively storing, by a controller of the cart, the position information of the transmission module;
generating, by the controller, a moving path corresponding to the position information of the transmission module; and
moving, by a driver of the cart, the cart along the moving path,
wherein the method further comprises:
performing, by the controller, pairing between the transmission module and the positioning sensor; and
adjusting, by the controller, a distance between the transmission module and the cart based on a moving speed of the transmission module.

10. The method according to claim 9, further comprising:
storing, by the controller, information on a reference point to calculate a position of the cart and the position of the transmission module;
calculating, by the controller, the position of the cart with respect to the reference point based on a moving distance of the driver and a moving direction of the driver;
calculating, by the positioning sensor, the position of the transmission module based on the cart;
generating, by the controller, position information of the transmission module based on the reference point and the cart; and
storing, by the controller, the position information of the transmission module.

11. The method according to claim 9, further comprising:
generating, by the controller, the moving path based on two or more kinds of stored position information of the transmission module; and
controlling, by the controller, the driver to move the cart along the moving path generated based on the two or more kinds of stored position information of the transmission module.

12. The method according to claim 11, further comprising:
when the obstacle sensor senses the obstacle provided in the moving path, controlling, by the controller, the driver to deviate the cart from the moving path to avoid the obstacle; and
generating, by the controller, an updated moving path including a point corresponding to a position at which the cart is able approach the transmission module.

13. The method according to claim 11, further comprising:
comparing, by the controller, a moved point of driver controlled by the controller with the position; and
in response to the cart being within a predetermined distance or less of a position corresponding to the position information, deleting, by the controller, the position information.

14. The method according to claim 9, further comprising:
when the cart does not arrive at a position corresponding to the position information of the transmission module after a predetermined period of time, deleting, by the controller, the position information of the transmission module.

15. The method according to claim 9, further comprising:
resetting, by the controller, a position of the cart based on a reference point to generate the position information based on at least one of a distance between the cart and the transmission module or a period of time for which the cart is immobile due to the obstacle.

16. The method according to claim 9, further comprising:
correcting, by the controller, the position information of the transmission module based on a range in which the transmission module repeatedly swings to generate corrected position information of the transmission module; and
storing, by the controller, the corrected position information of the transmission module.

17. The cart according to claim 1, wherein the controller is further configured to:
when the cart is disposed inside a neutral zone around the transmission module, reset a current position of the cart based on coordinates corresponding to an origin point of the cart.

18. A method for controlling a cart to follow a transmission module, the method comprising:
receiving, by a positioning sensor of the cart, a signal from the transmission module and measuring a position of the transmission module;
accumulatively storing, by a controller of the cart, the position information of the transmission module;
generating, by the controller, a moving path corresponding to the position information of the transmission module; and
moving, by a driver of the cart, the cart along the moving path,
wherein the method further comprises:
when the cart is disposed inside a neutral zone around the transmission module, resetting, by the controller, a current position of the cart based on coordinates corresponding to an origin point of the cart.

\* \* \* \* \*